(12) United States Patent
Wang et al.

(10) Patent No.: US 10,706,290 B2
(45) Date of Patent: Jul. 7, 2020

(54) METHOD AND SYSTEM FOR PROVIDING PERSONALIZED ON-LOCATION INFORMATION EXCHANGE

(71) Applicant: MIDEA GROUP CO., LTD., Foshan (CN)

(72) Inventors: Dongyan Wang, San Jose, CA (US);
Suresh Mani, San Jose, CA (US);
Mingyi Yang, San Jose, CA (US);
Edwin Lichteveld, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 127 days.

(21) Appl. No.: 16/158,027

(22) Filed: Oct. 11, 2018

(65) Prior Publication Data

US 2019/0163985 A1    May 30, 2019

Related U.S. Application Data

(60) Provisional application No. 62/572,242, filed on Oct. 13, 2017.

(51) Int. Cl.
*G06K 9/00* (2006.01)
*G06Q 30/06* (2012.01)
*G06Q 30/00* (2012.01)

(52) U.S. Cl.
CPC ......... *G06K 9/00778* (2013.01); *G06Q 30/00* (2013.01); *G06Q 30/0631* (2013.01)

(58) Field of Classification Search
None
See application file for complete search history.

(56) References Cited

U.S. PATENT DOCUMENTS 6,963,851 B1 * 11/2005 Szabo ............... G06Q 30/02
186/56
10,346,621 B2 * 7/2019 AthuluruTirumala ................
G06Q 10/109

(Continued)

FOREIGN PATENT DOCUMENTS

CN    102122346 A  *  2/2011
CN    102122346 A     7/2011

(Continued)

OTHER PUBLICATIONS

Midea Group Co., Ltd., International Search Report and Written Opinion, PCT/CN2018/109720, dated Jan. 9, 2019, 9 pgs.

*Primary Examiner* — Andrae S Allison
(74) *Attorney, Agent, or Firm* — Morgan, Lewis & Bockius LLP

(57) ABSTRACT

A method includes: deploying a frontend system (FIES); activating input streams from on-site cameras located at a current deployment location of the FIES; in accordance with the respective input stream of a first camera, registering an inspection event of a user in association with a first sample product on display; detecting a close-proximity interaction between the user and the FIES; automatically generating a first product recommendation, including: if the inspection event meets enhanced inspection criteria, which are met when a second inspection event of the first user exists in previously stored inspection events associated with the respective first sample product, automatically adding a product-specific description of the first sample product in the first product recommendation; and otherwise, forgoing including the product-specific description of the first sample product in the first product recommendation; and providing, through the frontend information exchange system, the first product recommendation to the first user.

20 Claims, 7 Drawing Sheets

(56) References Cited

U.S. PATENT DOCUMENTS

| | | | |
|---|---|---|---|
| 2005/0144072 A1* | 6/2005 | Perkowski | G06Q 30/02 705/14.49 |
| 2008/0015937 A1* | 1/2008 | Perkowski | G06Q 30/02 705/14.51 |
| 2008/0097847 A1* | 4/2008 | Perkowski | G06Q 30/02 705/14.38 |
| 2011/0238506 A1* | 9/2011 | Perkowski | G06Q 30/02 705/14.73 |
| 2013/0173419 A1* | 7/2013 | Farber | G06Q 30/0631 705/26.7 |
| 2014/0129942 A1* | 5/2014 | Rathod | H04N 21/44222 715/720 |
| 2016/0335686 A1* | 11/2016 | AthuluruTirumala | G06F 3/0482 |
| 2016/0379145 A1 | 12/2016 | Valentino, III et al. | |
| 2017/0352084 A1 | 12/2017 | Gu et al. | |
| 2018/0276731 A1* | 9/2018 | Patel | G06Q 30/0631 |
| 2019/0114689 A1* | 4/2019 | Wang | G06Q 30/0631 |
| 2019/0355041 A1* | 11/2019 | Sewak | G06Q 30/0631 |

FOREIGN PATENT DOCUMENTS

| | | |
|---|---|---|
| CN | 102376061 A | 3/2012 |
| CN | 104680387 A | 6/2015 |
| CN | 105869015 A | 8/2016 |

* cited by examiner

Xiaomei: Hello, Mr. Ma, welcome to Shenzhen! I am Xiaomei at the Shenzhen branch store. It seems that you are interested in some water heaters, is that right?

Mr. Mar: Yes. I want to buy three water heaters.

Xiaomei: Ok. Would you like to also look at some air conditioners? We currently have some great deals for air conditioner and water heater bundles.

Mr. Ma: Ok, can you make some recommendations?

Xiaomei: Sure. Please take a look at the following models. They have been very popular among young professionals with families. I matched styles and colors of these appliances to the kitchen appliances you purchase previously. But other color and style choices are also available.
Recommended bundle A: 3 x water heaters 100L, RSJ-20/100RD $299.00 + 3 x air conditioners KFR-72LW $1399 = total $5094.00 (Your price after discount: $4300)

Recommended bundle B: 3 x water heaters 150L, KFP-72/100RD $599.00 + 3 x air conditioners KF66-7AD3 $1799 = total $7194.00 (Your price after discount: $6500, with a free toaster oven (value of $199))

Mr. Ma: I would like to take the second bundle.

Xiaomei: We appreciate your business. Your previous delivery address was in Beijing. Would you like to change your address?

Mr, Ma: Yes.

Xiaomei: Are you looking for any other appliances for your new home?

302 Deploy a frontend information exchange system, wherein the frontend information exchange system provides an input user interface configured to detect one or more in-person close-proximity interactions between a user and the frontend information exchange system 304 Activate respective input streams from one or more on-site cameras located at a current deployment location of the frontend information exchange system, wherein each of the one or more on-site cameras is located in proximity to a respective sample product on display at the current deployment location of the frontend information exchange system 306 In accordance with the respective input stream of a first camera of the one or more on-site cameras, register a first inspection event of a first user in association with a first sample product on display at the current deployment location of the frontend information exchange system 308 Detect a first in-person close-proximity interaction between the first user and the frontend information exchange system at the current deployment location of the frontend information exchange system 310 In response to the first in-person close-proximity interaction between the first user and the frontend information exchange system, automatically generate a first product recommendation, including:

312 in accordance with a determination that the first inspection event of the first user that has been registered in association with the first sample product meets enhanced inspection criteria, wherein the enhanced inspection criteria include a criterion that is met when at least a second inspection event of the first user exists in a plurality of previously stored inspection events associated with the respective first sample product, automatically adding a product-specific description of the first sample product in the first product recommendation 314 in accordance with a determination that the first inspection event of the first user that has been registered in association with the first sample product does not meet the enhanced inspection criteria, forgoing including the product-specific description of the first sample product in the first product recommendation 316 Provide, through the frontend information exchange system, the first product recommendation to the first user

Figure 3

METHOD AND SYSTEM FOR PROVIDING PERSONALIZED ON-LOCATION INFORMATION EXCHANGE

CROSS REFERENCE TO RELATED APPLICATION

This application claims priority under § 119(e) and the benefit of U.S. Provisional Application. No. 62/572,242, filed Oct. 13, 2017, the disclosure of which is incorporated herein in its entirety.

FIELD OF THE TECHNOLOGY

The present disclosure relates to integrating computer-based information processing with in-person close-proximity physical interactions to support customized, on-location man-and-machine information exchange, and in particular, to a method and system for providing personalized, on-location information exchange with a human user regarding appliance recommendations.

BACKGROUND OF THE TECHNOLOGY

In a day and age where e-commerce become increasing popular, many product venders devote a large amount of resources on developing and using on-line sales platforms that present images of products in a listing, and facilitate sales by providing product descriptions, online reviews, and information videos on individual product pages. Many of the on-line sales platforms also provide product search functions that identify subsets of all available products based on search keywords entered by a user. Although online sales platforms also provide an avenue for sales of home appliances, pure online sales platforms cannot meet users' desire to try out home appliances, to learn about their many features, to touch and manipulate the home appliances in person, or to see the home appliance operating in a physical environment that mimics the intended operating environment of the users' homes. Pure online sale platforms also cannot provide a user with any real-time, personalized attention and assistance at a location where the users have the in-person close-proximity experiences with the appliances.

Brick and mortar stores are becoming increasingly rare and costly to operate. Good and efficient sales staff are not only difficult to find but also expensive to maintain. In addition, one sales person may develop a good rapport and win a sale with one customer, but may face avoidance and rejection with respect to a different customer. In the short amount of time that a customer typically spends inside a brick and mortar store, a real human sales person simply does not have the personality, energy, capacity, or knowledge to provide truly personalized service and assistance to each customer that walks through the door.

Recently, there has been a great deal of interest in developing in-store sales robots. However, many of the state-of-the-art in-store sales robots that have been contemplated are crude combinations of the existing e-commerce backend system with added natural language processing capabilities. The sales robots simply mimic a crude natural language exchange with a customer based on generic language models and keyword identifications, and are not much more effective than the existing online sales platforms. Generic statistical modeling of mass customer data on the backend system also does not take into account of an individual customer's unique in-store experience with the products, and does not take into account the uniqueness of appliance shopping in comparison with shopping of other types of products or merchandise. The advancement of in-store sales robots are also severely limited by the availability of relevant data and the lack of efficient and effective ways of selecting relevant parameters and prioritizing data processing and storage tasks.

Therefore, an improved method and system of providing personalized, on-location information exchange regarding home appliances that is fast, efficient, and effective is needed.

SUMMARY

As discussed in the background, many state-of-the art sales robots or in-store kiosks rely on statistical modeling of mass sales data and attempt to place individual users into crude categories as opposed to providing truly personalized information exchange with the individual users. In addition, the computer-based information processing and an individual user's in-person on-location experience are either completely decoupled from each other or simply combined based on a crude additive strategy without creating any synergy between the two. The integration between the user's in-store experience and the backend computer-based information processing capabilities needs to be well thought out, and tailored to each individual user, and to the uniqueness of the user's past and present circumstances. By dynamically changing how the different artificial intelligence strategies and models interact with each other, rearranging their relative roles in the overall model retraining, user characteristic prediction, product recommendation generation, and direct information exchange processes, and readjusting their relative importance in the overall model retraining, user characteristic prediction, product recommendation generation, and direct information exchange processes, the information exchange system (a backend server system and a frontend sales robot or kiosk) can provide better user experience and better sales results when it is engaged by a user at a physical deployment location (e.g., a brick and mortar store or exhibition hall) where real products are on display and available for user manipulation and inspection.

The system and method disclosed herein take on the technical challenges to address the deficiencies of conventional ecommerce platforms and the deficiencies of brick and mortar stores. In some embodiments, a frontend information exchange system (e.g., a sales robot or kiosk) is deployed at a deployment location (e.g., a brick and mortar store or exhibition hall) and is used to acquire and optionally process data inputs through direct, in-person close-proximity interactions with human users; and a backend information exchange system is used to generate artificial intelligence models, rules, and decision logic, and to derive relevant parameters and effectively integrate those parameters with other relevant data that is made available through computer-based information processing capabilities of the backend information exchange system. Specifically, the backend information exchange system is designed to identify particular data that, when combined with the relevant information and parameters obtained through the in-person close-proximity interactions with the human users, enable previously unavailable decision paths and enhance predictability of user preferences and intent for the particular user in question. In addition, the parameters obtained through in-person close-proximity interactions with the users also enable the backend information exchange system to further dynamically prioritize data storage and data processing needs for the present information exchange tasks, and thereby making the information exchange system more efficient, and less resource-constrained. In the end, the interactions and the results of the interactions are processed to further refine the persona of the user and the prediction models that are used for recommending products interacting with the user.

As disclosed herein, in some embodiments, a method of providing information exchange (e.g., providing machine-generated product recommendations, such as recommendations for home appliances) includes: at an electronic device (e.g., a server hosting a product recommendation engine) having one or more processors, and memory: deploying a frontend information exchange system, wherein the frontend information exchange system provides an input user interface configured to detect one or more in-person close-proximity interactions between a user and the frontend information exchange system (e.g., interactions by voice, touch, sight, gesture, etc. that are enabled by the close physical proximity between the user and the frontend information exchange system); registering a current deployment location of the frontend information exchange system; detecting a first in-person close-proximity interaction between a first user and the frontend information exchange system at the current deployment location of the frontend information exchange system, wherein the first in-person close-proximity interaction specifying a first product category for which the first user is seeking product recommendations; in response to the first in-person close-proximity interaction between the first user and the frontend information exchange system: automatically generating a first product recommendation, wherein the first product recommendation includes a first product of the first product category that is selected based at least in part on the registered current deployment location of the frontend information exchange system; detecting a respective prior purchase record of the first user for a second product in a second product category that is associated with the first product category; in accordance with a determination that the respective prior purchase record for the second product indicates a purchase or delivery location outside of a predefined geographic region of the registered current deployment location of the frontend information exchange system, automatically augmenting the first product recommendation to include a third product from the second product category that is selected based on characteristics of the second product; and in accordance with a determination that the respective prior purchase record for the second product indicates a purchase or delivery location within the predefined geographic region of the registered current deployment location of the frontend information exchange system, automatically refining the first product recommendation to further define one or more characteristics of the first product based on the characteristics of the second product; and providing, through the frontend information exchange system, the first product recommendation to the first user after the automatic augmenting or refining of the first product recommendation.

As disclosed herein, in some embodiments, a method of providing information exchange (e.g., providing machine-generated product recommendations, such as recommendations for home appliances) includes: at an electronic device (e.g., a server hosting a product recommendation engine) having one or more processors, and memory: A method of providing machine-generated product recommendations, comprising:

at an electronic device (e.g., a server hosting a product recommendation engine) having one or more processors, and memory: deploying a frontend information exchange system, wherein the frontend information exchange system provides an input user interface configured to detect one or more in-person close-proximity interactions between a user and the frontend information exchange system (e.g., interactions by voice, touch, sight, gesture, etc. that are enabled by the close physical proximity between the user and the frontend information exchange system); activating respective input streams from one or more on-site cameras located at a current deployment location of the frontend information exchange system, wherein each of the one or more on-site cameras is located in proximity to a respective sample product on display at the current deployment location of the frontend information exchange system; in accordance with the respective input stream of a first camera of the one or more on-site cameras, registering a first inspection event of a first user in association with a first sample product on display at the current deployment location of the frontend information exchange system; detecting a first in-person close-proximity interaction between the first user and the frontend information exchange system at the current deployment location of the frontend information exchange system; in response to the first in-person close-proximity interaction between the first user and the frontend information exchange system, automatically generating a first product recommendation, including: in accordance with a determination that the first inspection event of the first user that has been registered in association with the first sample product meets enhanced inspection criteria, wherein the enhanced inspection criteria include a criterion that is met when at least a second inspection event of the first user exists in a plurality of previously stored inspection events associated with the respective first sample product, automatically adding a product-specific description of the first sample product in the first product recommendation; and in accordance with a determination that the first inspection event of the first user that has been registered in association with the first sample product does not meet the enhanced inspection criteria, forgoing including the product-specific description of the first sample product in the first product recommendation; and providing, through the frontend information exchange system, the first product recommendation to the first user.

In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device, cause the device to perform or cause performance of the operations of any of the methods described herein. In accordance with some embodiments, an electronic device includes means for performing or causing performance of the operations of any of the methods described herein. In accordance with some embodiments, an information processing apparatus, for use in an electronic device includes means for performing or causing performance of the operations of any of the methods described herein.

Various additional advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 2 is example user interface of a frontend information exchange system in accordance with some embodiments.

FIG. 3 is a flowchart diagram of a method of providing information exchange in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Figure 1A:
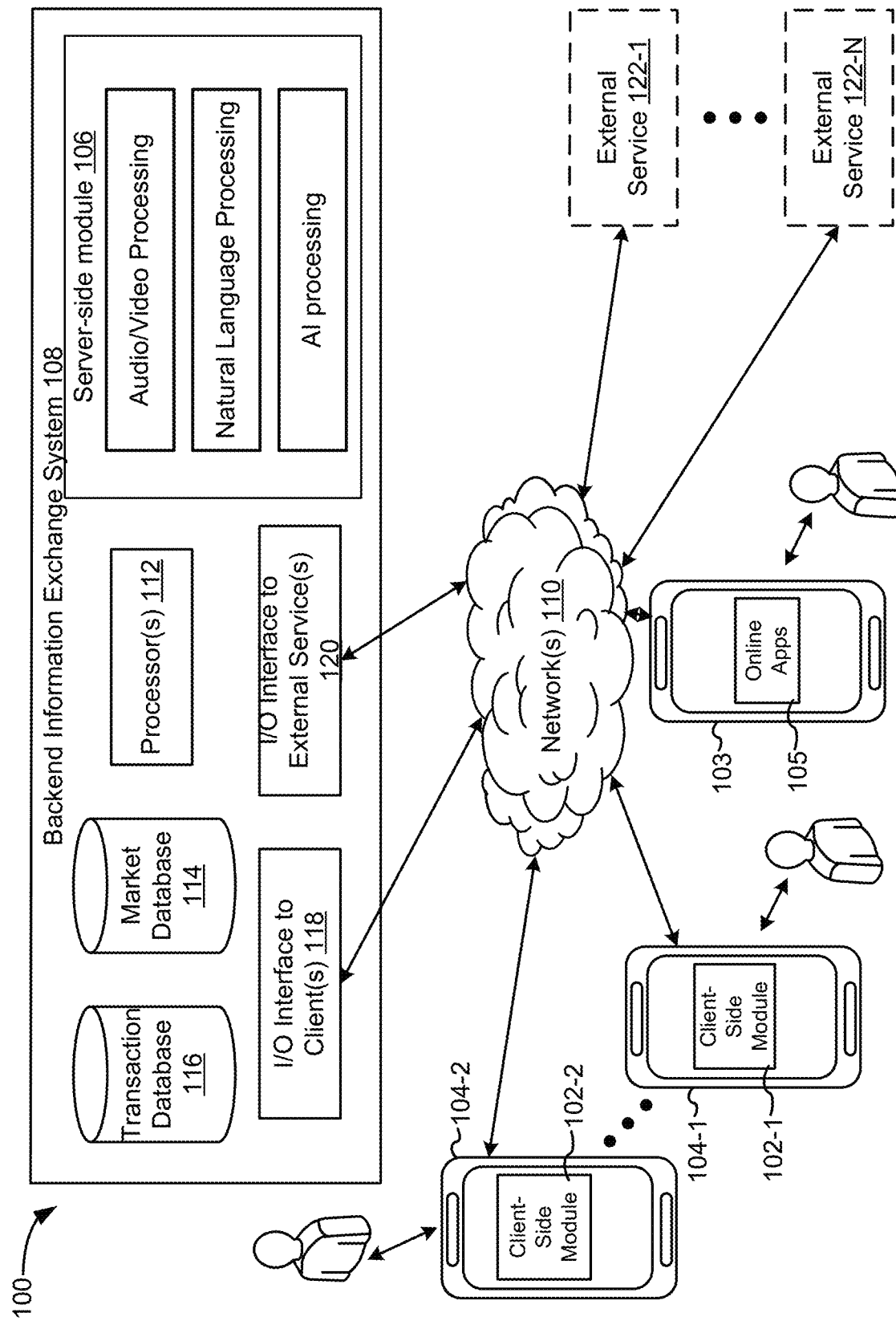
FIG. 1A is a block diagram illustrating an operating environment of an information exchange system, in accordance with some embodiments.

As shown in FIG. 1A, an information exchange system 100 (e.g., including a backend information exchange system 108 and one or more frontend information exchange system 104) is implemented in accordance with a server-client interaction model in accordance with some embodiments. In accordance with some embodiments, the server-client interaction model includes client-side modules 102-1, 102-2, etc. (also referred to as the "frontend modules 102") executed on a frontend information exchange system 104-1, 104-2, etc. that are deployed at various deployment locations (e.g., brick and mortar stores, roadshow booths, product demonstration sites, exhibition halls, etc.). In some embodiments, the server-client interaction model further includes a server-side module 106 (also referred to as the "backend module 106") executed on a backend server system (e.g., backend information exchange system 108). The frontend modules 102 communicate with the backend module 106 through one or more networks 110. The frontend modules 102 provide user-side functionalities for the information exchange system 100 and communicate with the backend module 106. The backend module 106 provides server-side functionalities for the information exchange system 100 for any number of frontend modules 102 each residing on a frontend information exchange system 104 (e.g., an on-site kiosk, sales robot, etc.).

In some embodiments, the backend module 106 includes one or more processors 112, various proprietary databases (e.g., databases 114 for market analysis data, and databases 116 for customer transactions, databases for current customer interaction sessions, and databases for user profiles, etc.), I/O interface 118 to one or more frontend modules, and an I/O interface 120 to one or more external services or other individual online interactions (e.g., user interacting with the information exchange system 100 through pure online sales channel (e.g., ecommerce or social networking apps 105) on their individual user devices 103 (e.g., smart phones, tablet devices, and personal computers)).

In some embodiments, the I/O interface 118 to frontend modules facilitates the client-facing input and output processing for the frontend modules 106. The I/O interface 118 further includes input processing for various peripheral equipment such as on-site cameras, GPS trackers, and/or on-site microphones distributed throughout (e.g., over each product on display, or over product display region, along each aisle, etc.) each of various deployment locations of the frontend information exchange systems 104. In some embodiments, the backend information exchange system 108 directly communicates with and controls the on-site peripheral equipment. In some embodiments, the backend information exchange system 108 communicates with and controls the on-site peripheral equipment via the frontend information exchange systems located at the various deployment sites where the on-site peripheral equipment are located respectively.

In some embodiments, the databases 114 store various market analysis data (e.g., factors that are influential to sales and profits, customer perception, strategic sales and marketing planning, etc.) that is statistical or aggregated in nature and represents summaries and trends of past marketing, sales, and research results. The databases 116 store individual transaction records organized in various searchable formats (e.g., by customer name, age, income level, color preference, previously purchased product, product category, product combination/bundle, previous inquired product, past delivery location, interaction channel, sales representative, location of interaction, purchase time, delivery time, customer comments, special requests, etc.). Other databases include a user profile database that includes searchable characteristics for each user (e.g., identity data, demographic data, social relationships, social network account names, social network publication or comments, interaction records with sales representatives, customer service representatives, or delivery personnel, preferences, dislikes, sentiment, beliefs, superstitions, personality, temperament, interaction style, etc.).

In some embodiments, the databases 116 stores user profile data. The user profile data includes integrated personas that are generated based on self-descriptions directly obtained from the users (e.g., via sales records, or evaluations, surveys, etc.), descriptions on social networks or public records (e.g., publications, comments, social network interests, etc.), descriptions provided through direct human interactions and human observations (e.g., descriptions recorded by sales representatives, delivery personnel, customer service representatives, such as age, weight, living environment, personality, temperament, interests, human interaction style and preferences, personal styles and tastes, etc.), images and descriptions of the images (e.g., images of the user's visits to the stores, images posted on social media, etc., including which products the user looked at, interacted with, whether the user was with family, friends, or alone, how the user looked, the mood of the user, etc.), the user's browsing route and browsing styles such as whether the user directly looked at the products of interest or prefers to roam and browse in a wide variety of product categories, whether the user engaged any sales personnel during his/her visit, etc.

The other databases also include a session database that temporarily stores data that is currently collected through on-site interactions with individual users (e.g., images of each user that are captured while the user is browsing through the different products on display along the various aisles, images of the user when the user is interacting directly with the frontend information exchange system 104 that has been deployed at the store, speech interactions or textual exchanges between the user and the frontend information exchange system 104, the browsing route and pattern of the user in the store, browsing and viewing of electronic information (e.g., interaction with the product description or demos at the store for each product) at the store, virtual reality and augmented reality interactions the user had with the product on display, etc.).

In some embodiments, the I/O interface 120 to one or more external services facilitates communications with one or more external services 122 (e.g., web servers or cloud-based service providers such as file sharing, data storage services, data collection and dispensary services, data forecast services, etc.). For example, the external services 122 optionally include a weather forecast service and provide current, future, and historic weather data for various locations and dates. The external services 122 optionally include intelligence data on sales and promotion strategies for competitors or related products. The external services 122 optionally include fortune forecasting and historic fortune forecast records, or principles of various forecast or belief systems. Each of these external services optionally provide data that is used to train a prediction model, provide basis for a statistical analysis, provide basis for establishing a personal profile for a particular user, and/or used in a current prediction or analysis using existing models, rules, and statistical analysis results.

Examples of the frontend information exchange system 104 include, but are not limited to, an on-site computer kiosk, a mobile sales robot, a humanoid robot, a centrally-controlled display terminal, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point of sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The backend information exchange system 108 is implemented on one or more standalone data processing apparatuses or a distributed network of computers. In some embodiments, the backend information exchange system 108 also employs various virtual devices and/or services of third-party service providers (e.g., third-party cloud service providers) to provide the underlying computing resources and/or infrastructure resources of the backend information exchange system 108. In some embodiments, the backend information exchange system 108 includes, but is not limited to, a handheld computer, a tablet computer, a laptop computer, a desktop computer, a server computer, or a combination of any two or more of these data processing devices or other data processing devices.

The backend information exchange system 108 also implements various modules for supporting the frontend interactions and product recommendations to the user located at different frontend deployment locations. In some embodiments, the backend information exchange system includes audio/video processing services, natural language processing services, model building services, statistical analysis services, data mining services, data collection services, and product recommendation services, etc., based on various statistical techniques, rule-based techniques, and artificial intelligence-based techniques.

The information exchange system 100 shown in FIG. 1A includes both a client-side portion (e.g., the frontend module 102) and a server-side portion (e.g., the backend module 106). In some embodiments, data processing is implemented as a standalone application installed on a frontend device 104 that is deployed at a deployment location that physically displays a plurality of actual products (e.g., home appliances, furniture, heavy equipment, vehicles, etc.), where the user is physically present at the location and directly interacts with the frontend device(s) and the products. In addition, the division of functionalities between the client and server portions of information exchange system 100 can vary in different embodiments. For example, in some embodiments, the frontend module 102 is a thin-client that provides only user-facing input and output processing functions, and delegates all other data processing functionalities to a backend server (e.g., the backend information exchange system 108). Although many aspects of the present technology are described from the perspective of the backend system, the corresponding actions performed by the frontend system would be apparent to ones skilled in the art without any creative efforts. Similarly, although many aspects of the present technology are described from the perspective of the frontend system, the corresponding actions performed by the backend system would be apparent to ones skilled in the art without any creative efforts. Furthermore, some aspects of the present technology may be performed by the server, the client device, or the server and the client cooperatively. In some embodiments, some of the databases (e.g., user profile data for users with known home locations) are distributed at various locations that are local to some of the frontend systems, which enable faster data access and local data processing time.

Figure 1B:
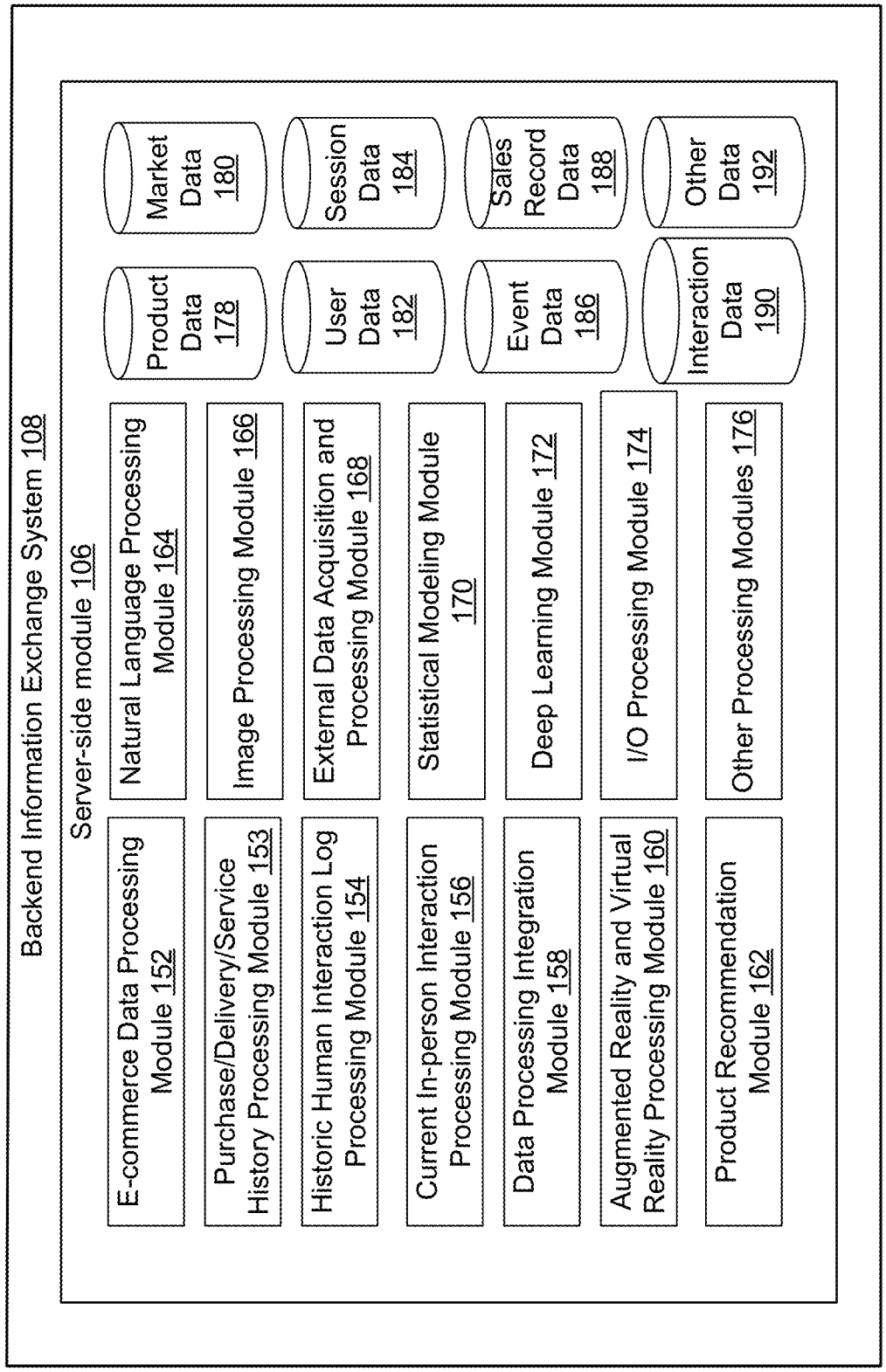
FIG. 1B is a block diagram illustrating exemplary components of a backend information exchange system in accordance with some embodiments.

FIG. 1B is a block diagram illustrating exemplary components of the backend information exchange system 108 in accordance with some embodiments. In FIG. 1B, the backend information exchange system 108 includes a plurality of modules, including e-commerce data processing module 152, purchase/delivery/service history processing module 153, historic human interaction log processing module 154, current in-person interaction processing module 156, data processing integration module 158, augmented reality/virtual reality processing module 160, product recommendation module 162, natural language processing module 164, image processing module 166, external data acquisition and processing module 168, statistical modeling module 170, deep learning module 172, I/O processing module 174, and other modules 176 (e.g., satisfaction scoring, demographic determination, etc.) and sub-modules. The data that is accessible to the backend information exchange system 108 include product data 178, market data 180, user data 182, session data 184, external event data 186, historic sales record data 188, human interaction log 190, and other data 192 (e.g., belief data, policy data, etc.). These modules utilizes the various real-time data obtained through various internal and external services, real-time data received from the frontend information exchange systems, and existing data stored in the various databases, to guide the in-person interactions with the users at various deployment locations of the frontend information exchange systems 104 and generate product recommendations to the users.

Figure 1C:
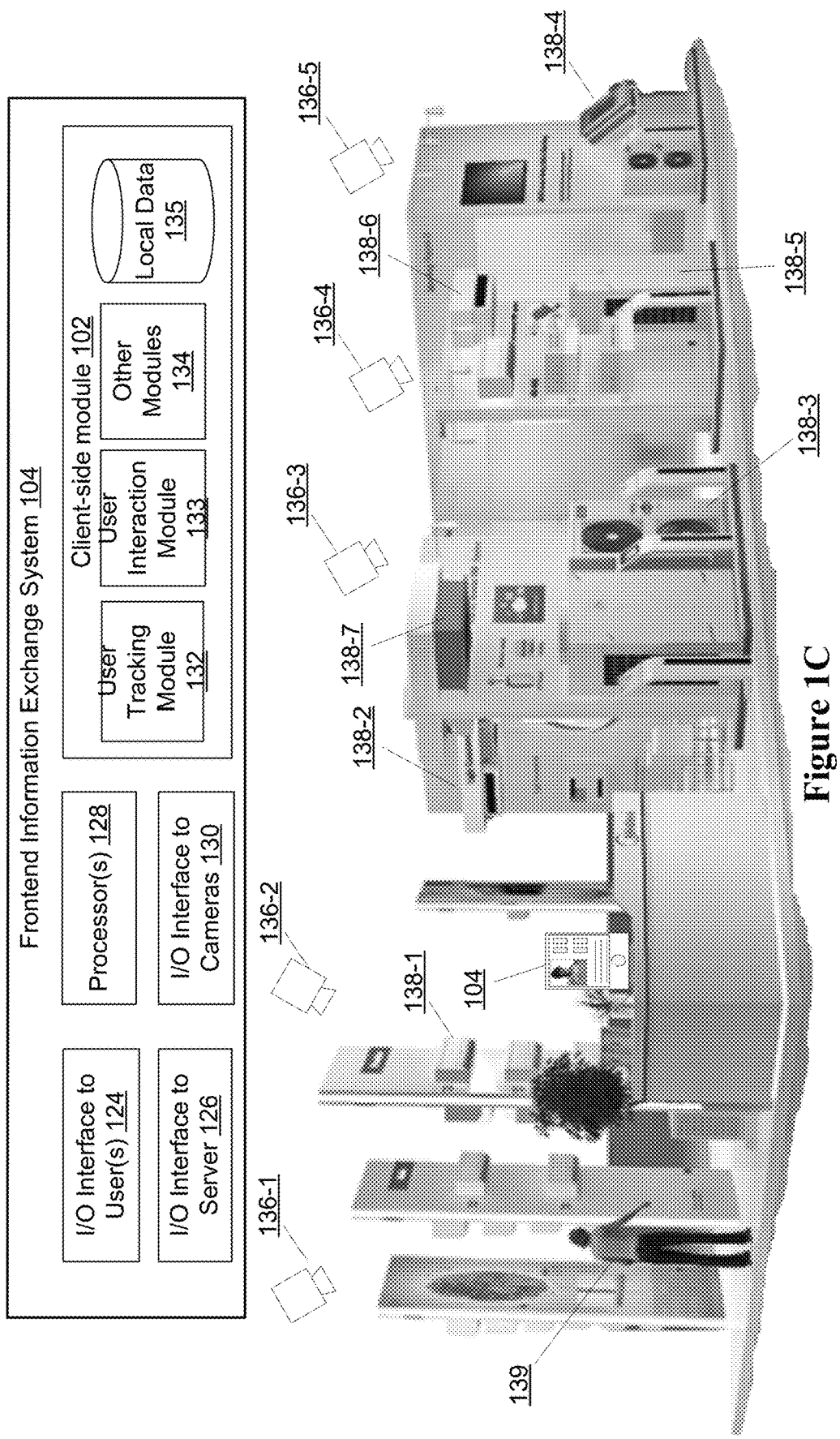
FIG. 1C is a block diagram illustrating exemplary components of a frontend information exchange system and its deployment environment in accordance with some embodiments.

FIG. 1C is a block diagram illustrating exemplary components of the frontend information exchange system 104 in accordance with some embodiments. The frontend system 104 is deployed at a deployment location (e.g., a brick and mortar store or display venue) where many products (e.g., products such as home appliances 138) are physically on display. A user (e.g., user 139) can walk around the deployment location and physically inspect the products on display. Peripheral equipment such as GPS trackers, microphones, and cameras (e.g., cameras 136) are distributed throughout the deployment location, e.g., in proximity to different products, different product display locations, and/or different product categories, where the output streams from the peripheral equipment captures the location, voice, and images of the users at the various parts of the deployment location. The frontend information exchange system 104 may be a robot with a humanoid form, or a computer-kiosk with a display and a speaker, or somewhere in between. A user (e.g., user 139) can walk close up to the frontend information exchange system and directly engage in in-person, close proximity interactions with the frontend information exchange system, e.g., through speed, gesture, facial expressions, touch, movement, keyboard entry, or other physical manipulations, that are enabled due to the close physical proximity between the user and the frontend information exchange system.

In FIG. 1C, the frontend information exchange system 104 includes one or more processors 104, a plurality of interfaces and modules, including I/O interface 124 to users, I/O interface 126 to server, I/O interface 128 to peripheral equipment (e.g., camera, speaker, display, etc.), user tracking module 132, user interaction module 133, and other modules 134 and sub-modules. The frontend information exchange system 104 further have access to local data 135, which may include local personnel files, local inventory data, etc. These modules utilizes the various real-time data obtained through various internal and external services, real-time data received from the peripheral equipment and the backend information exchange systems, and existing data stored in the local databases, to provide the in-person interactions with the users and provide product recommendations to the users.

In accordance with some embodiments, e.g., as shown in FIGS. 1A-1C, the information exchange system 100 is implemented to develop deep understanding of users (e.g., customers and potential customers) based on their explicit expressions of their needs, requirements and interests in products (e.g., through direct interactions with human sales representatives, customer service representatives, and/or the frontend information exchange system), their past and present purchase and product browsing patterns (e.g., browsing routes, number of repeated visits, time length of purchase-decision-making, decision-making factors, time of decision, types of products purchased, types of products compared, information sources, solo decision-making or family/friends collaborated decision-making, etc.), local external/natural conditions (e.g., weather, location, local environment (e.g., prices of electricity, water, availability of alternative energy sources, etc.), etc.), external events (e.g., introduction of new products and new product features, introduction of new alternative products into the market, introduction of new energy policies and restrictions by the government, natural disasters, etc.), customer segmentation (e.g., segmentation of customers based on demographic data, such as age, income level, social status, gender, ethnicity, family composition, superstition/belief systems, spending habit, profession, trend follower/trend setter, etc.), customer sentiment (e.g., reviews, comments, survey results, etc.), and many other factors.

With the deep understanding of customers in general, as well as the deep understanding of specific individual customers, the direct interactions with each specific customer is formulated in a manner that caters to that customer's specific needs, style, and preferences, makes the communication with that customer more pleasant and the product recommendations more targeted and timely, and makes the information exchange more effective to complete sales and encourage continued trust and future visits by the customer.

Furthermore, in some embodiments, the information exchange system 100 continuously gathers data, processes data, and mines data to improve the accuracy of the prediction models and statistics, and decision-making intelligence. During a particular interaction with a customer, the information exchange system 100 utilizes feedback and information received from the individual customer to modify the selection and priority of the models and decision-making logic used to generate the predictions, interactions, and recommendations, thereby improving the data processing speed and efficiency, as well as improving the accuracy and effectiveness of the predictions, interactions, and recommendations. For example, the individual user's reactions, sentiment, and intent (e.g., obtained via analysis of the words, facial expressions, gestures, postures, etc.) are fed back to the information exchange system in real-time to adding additional parameters to the analysis, prediction, and recommendation models, or reselect the set of models (e.g., removal, replacement, and/or addition of models) that are used to perform the analysis, prediction, and recommendations, and/or to redirect the decision-making intelligence/logic, etc. Through continuous engagement with the customer during the one-on-one on-site interactions, the relevant and pertinent information (e.g., product features, price points, service requirements etc.) is quickly and timely provided to the customer, helping the customer to make the purchase decision more quickly and with high confidence.

In some embodiments, the backend information exchange system builds user profiles and product profiles using various artificial intelligence techniques. For example, the backend information exchange system integrates the knowledge and conclusions from the different data sources and analysis methods, such as various machine learning algorithms and specially engineered decision logic and algorithms, and/or combinations thereof (e.g., various types of neural networks, deep neural networks, search and optimization analysis, rule-based decision logic, probabilistic methods and fuzzy logic, Bayesian networks, hidden Markov models, classifiers and statistical learning models, cybernetics, etc.), to determine the user's identity, key characteristics of the user that are the most influential to his/her purchasing decision-making, key characteristics of the user's current intent, and uses the above to identify a subset of models and analysis tools to further generate the suitable responses to the user and provide the most relevant recommendations using as little computational resources as possible, and as quickly as possible.

In some embodiments, the backend information exchange system provides image analysis capabilities which process image streams from strategically placed cameras at a deployment location of the frontend information exchange system, and correlate the results of the image processing to determine the identities and basic characteristics of the users that visit the deployment location (e.g., through facial recognition or general demographic analysis based on the appearance of the user), their browsing pattern and route throughout the deployment location, and/or whether the users are alone or with family or friends (e.g., by analyzing the distance and cohesiveness of the people in image streams of multiple cameras placed in proximity to different products throughout of the deployment location of the frontend information exchange system). In some embodiments, the information exchange system optionally identifies a particular visitor or a group of visitors as a high potential customer/customer group (e.g., based on the amount of time that the visitor(s) have stayed in front of a product or a set of similar products, the overall satisfaction scores of the visitor(s)) when inspecting a product or a set of similar products, the types of information that the user reviewed for a product or a set of similar products, etc.), and provides instructions to adjust the cameras' positioning to follow and/or focus on the high potential customer/customer group for a predefined duration and/or range, in lieu of keeping the fixed camera angle and zoom level for a region in front of the product. In some embodiments, the information exchange system also starts some initial data processing in anticipation of the possible questions or requests from the high potential customers that have been identified. For example, the information exchange system optionally retrieves previous purchase records of the high potential customers, and computes several high probability decision-making triggers (e.g., timing, season, price point, deals, product feature, trend, etc.) for the high-potential customer/customer group before the customer/customer group makes an initial direct interaction with the frontend information exchange system. In some embodiments, the information exchange system provides an instruction to the frontend information exchange system (e.g., a mobile sales robot) to move to the identified high potential customer/customer group, and initiate direct engagement with the customer/customer group. In some embodiments, the frontend information exchange system optionally provides some initial information or recommendation to the high potential customer/customer group based on the initial analysis that is already performed. In some embodiments, the frontend information exchange system optionally selects a real human sales representative that has been determined to be a best fit (e.g., based on availability, personality fit, experience level, knowledge of the product in which the customer has shown interest, etc.) for the high potential customer/customer group, and displays an image of the real human sales representative on the frontend information exchange system. In some embodiments, speech output of the information exchange system also is provided in the voice of the real human sales representative, such that if the customer/customer group eventually wishes to speak to a real human sales representative, there is continuity and sense of connection already established for the real human sales representative in the mind(s) of the customer/customer group. In some embodiments, the information exchange system retrieves the records of previous human interactions with the customer, such as logs made by sales representatives, repair service providers, customer service representatives, installation service providers, delivery service providers, etc., which include comments and impressions of real human beings with the customer to determine characteristics of the interaction style, decision-making triggers, preferences, and/or temperament of the customer, generates an image of a sales representative for display on the frontend information exchange system in accordance with the determined characteristics, and engages the customer (e.g., ask questions, provide information and suggestions) in a manner that is predicted to be pleasing and effective for the customer.

In some embodiments, when a customer walks into the store, based on image processing of the image streams from one or more cameras located in the store, the information exchange system (e.g., through facial recognition, emotion recognition, color recognition, style recognition, accessary recognition, etc.) populate the corresponding retail purchasing scores calculated using dressing style, gender, age, and happiness level, etc. For example, i.e., a middle-class professional male, a stylish young lady, or a family with children will receive different recommendations including specific features each is likely to choose (e.g., color choice, size, easiness to operate, etc.).

In some embodiments, for unknown customers, their images, store engagement, and/or interactions with the frontend information exchange system are recorded over many visits and from many sources (e.g., different deployment locations, social media, public records, self-registration, etc.). The recorded data is used to identify existing customer profiles and/or create new unique customer profiles using various specialized artificial intelligence methods. In some embodiments, for existing customers, their profiles can be either identified through facial recognition based on image streams from the cameras installed inside the stores or be identified through customers logging in at the frontend information exchange system using their unique identifiers, such as phone numbers, IDs on social networks (e.g., WeChat, QQ, Weibo, etc.), and/or through conversation and self-introduction during the direction interactions with the frontend information exchange system.

In some embodiments, when existing customers' identities are recognized, their historical preferences, shopping behaviors, historical purchase patterns, customer segmentation, store credits, gift card balance, and coupon or discount information will be pulled out of the databases in real-time and used to generate accurate and high probability product recommendations for each customer based on his unique personas (e.g., customer profile) already recorded, based on the current in-store experience, and/or other third-party public information (e.g., public record regarding social status changes, marital status changes, etc.)

In some embodiments, the information exchange system carries information including current deployment location for each frontend information exchange system (e.g., store coordinates (e.g., longitude and latitude, street address, city, country, etc.)), store inventory statistics, season of the year, up-coming holiday events, historical sales trends, and/or consumer sentiments that are associated with the current deployment location of the frontend information exchange system, etc. This information will also be part of the input for the product recommendation module to process and identify suitable products for recommending to each customer that visits the deployment location and engages the frontend information exchange system.

In some embodiments, upon diagnosing for un-matched requirements after collecting the customer demands (e.g., if the information exchange system fails to locate specific products in the inventory due to lack of varieties of products), the information exchange system initiates a multi-tiered recommendation model based on the responses received from the customer to provide a supplementary customized recommendation. For example, the frontend information exchange system states to the user after an initial interaction and data processing: "Sorry, we do not currently have a double-door fridge in gold color, will you be interested in a double-door fridge in silver color, or a single door fridge in gold color?" Customer says, "No, what other colors do you have for the double-door models?" Based on the above rejection and response, the information exchange system removes or demotes the importance of the color parameter relative to the model style (e.g., double-door) for the subsequent recommendations, and/or selects a different set of prediction model(s) where the "double-door" style is used as one of the leading factors in the prediction and recommendations (e.g., as oppose to a model where color and model style are both leading factors). In addition, in some embodiments, the personal profile of the customer is also modified, and the style preference for the "double-door" style is given more weight and the color preference is given less weight in various databases and artificial intelligence models related to the customer and/or for the particular kinds of products (e.g., fridge or large appliances in general).

In some embodiments, the information exchange system is configured to provide an augmented reality experience and/or virtual reality experience (e.g., using various AR/VR equipment available at the current deployment location of the frontend information exchange system) that relate to the products being requested by the user or recommended to the user using the product recommendation module. In some embodiments, the request by a user to try out the AR or VR experience with respect to a particular product is recorded as a significant trigger event for initiating the product recommendation module and starts the computation for the product recommendation before the user initiates a direct interaction with the frontend information exchange system. In some embodiments, the user's reactions (e.g., verbal and facial expressions) to the AR and VR experience are processed and the results are used to modify the product recommendations and/or the AR and VR experiences. For example, if the user initially asked to try a first model of washing machine with the virtual reality setting, and was not able to figure out how to properly use the machine (e.g., manipulated multiple buttons and parts of the virtual washing machine with no apparent purpose for more than a threshold amount of time) and expressed frustration (e.g., verbally or through facial expressions), the information exchange system takes that information as new inputs and generates a new recommendation for another model with simpler functionalities but similar characteristics otherwise (e.g., similar color and dimensions). Alternatively, if the user has a personal profile that suggests that the user enjoys products with many features in general, the information exchange system does not suggest a new product, and instead offers assistance regarding the current model to the user. In some embodiments, the frontend information exchange system also generates a presence (e.g., a virtual representation of the frontend information exchange system inside of the AR/VR environment, and interacts with the user directly within the AR/VR environment). In some embodiments, the information exchange system also generates virtual guides (e.g., virtual installation personnel) that demonstrate how to use or install the product in the AR/VR environment. In some embodiments, the information exchange system allows the user to visualize multiple home appliances that are recommended to the user in their simulated home setup in the AR/VR environment.

In some embodiments, if a customer does not like the products recommended by the information exchange system, the information exchange system includes artificial intelligence modules that construct a conversation with the customer regarding the customer's reasons for rejecting the recommendations and gather more details about the user's requirements (e.g., price being too expensive, preference of a different color, other family members requiring special or additional accommodations, etc.). In some embodiments, the information exchange system adjusts the parameters and/or changes the selection models to launch a new round of recommendations according to the new information that has been obtained. In some embodiments, a threshold or a set of criteria are set to determine when it is time to cease making additional recommendations (e.g., when the number of rejected recommendations has exceeded a preset number, or when the customer's verbal or facial expression meets a threshold dissatisfaction score, and/or when particular predefined keywords or phrases are spoken by the user, etc.) and to redirect the conversation and alleviate the tension (e.g., asking if the user wishes to speak to a human representative, or if the user wishes to receive a coupon, or see a promotional video, or play a game to win a prize, etc.).

In some embodiments, the frontend information exchange system is mobile and can move and guide the customer to a recommended product that is on display at the deployment location (e.g., the store or exhibition hall). In some embodiments, the frontend information exchange system prints out a map or directions to the recommended product on display. In some embodiments, at the end of the conversation, the frontend information exchange system presents a summary of the recommendations, and allows the user to edit it (e.g., either via a graphical user interface provided by the frontend information exchange system or via verbally instructions or requests) with additional information and notes; and in the end, the frontend information exchange system emails or prints out the final result for the user to take home.

In some embodiments, the information exchange system generates personalized discount or promotion deals that are more tailored to each customer based on the customer's interactions with the frontend information exchange system, the historical records of the customer (e.g., previous purchases, previous visits, and previous engagements with the frontend information exchange systems), and/or data from the present visit (e.g., browsing route, products inspected, information or demo seen, sentiment expressed during the visit, etc.).

In some embodiments, the information exchange system utilizes quantity information obtained in the present interactions with the customer, and historic information obtained about the customer to determine how to generate quantity recommendations of requested products and related products, and/or how to generate bundled deals for the customer. For example, when the customer requests multiple quantity of a certain product, the quantity information and the product category is combined with a location change associated with the customer (e.g., a discrepancy between the deployment location of the frontend information exchange system and the previous delivery address of previously purchased products) by the information exchange system to automatically activate and recommend corresponding product bundles that include one or more of a product from each of multiple related product categories. The product and product categories are identified by the information exchange system in accordance with the customer profile and the current interactions with the frontend information exchange system. For example, when a customer demonstrates an interest in buying multiple quantity of certain products (e.g., three small water heaters), a smart situation-matching module is triggered to predict that the customers has one kitchen and two bathrooms, and determines the number of air conditioners that the customer may need (e.g., four or five air conditioners, one for the kitchen, one for the living room, two or three for the bedrooms that share two bathrooms). In some embodiments, if the historic record indicates that the user has previously purchased one water heater and two air conditioners, and no location change has been detected for the user, the recommended product bundle is adjusted to include four water heaters and three air conditioners (e.g., the user is estimated to have a kitchen, a living room, four bathrooms, and three bedrooms in his house, needing a total of five water heaters and five air conditioners). In some embodiments, the information exchange system also determines how old the existing purchases are, and whether the new request is for replacement or addition to the existing appliances and the quantity recommendations are adjusted accordingly. In some embodiments, if a comparison between the current deployment location and the locations in the historic records indicates that the user has moved to a new location, the recommendation is generated based on a new estimate of the number and types of rooms that the user has at the new location. For example, if the user requests three water heaters, it is estimated that the user also needs three or four air conditioners at the new location (e.g., given that it is not customary for people to take these appliances with them when they move). In some embodiments, if the user rejects the quantity suggestion, a new bundle suggestion is generated by the information exchange system (e.g., with a higher discount incentive, and/or less financial demand on the customer). In some embodiments, the related product categories (e.g., the correspondence between product categories) are pre-stored, and the types of products from the different product categories are also coordinated in style and price point, which are all selected in accordance with other information already known or predicted about the user. In some embodiments, the related product categories are user-specific. In some embodiments, the related product categories are location-specific. For example, for a deployment location in a climate that is very hot, the related product categories may be air conditioner and water heaters; while for a deployment location that is in a climate that is very cold, the related product categories may be water heater and space heaters. In some embodiments, if the information exchange system detects a status change or location change that indicates an increased average living cost and spending abilities, the information exchange system adjusts the recommendation and/or recommended bundles accordingly. For example, if the information exchange system detects that the user has moved from a second-tier city to a first-tier city or from a less affluent area to a more affluent area (e.g., based on address changes or store visit location changes), or that the user has changed the clothing style or added expensive accessories (e.g., through image processing that detects clothing styles and accessories, etc.), the information exchange system automatically activates an up-sell model to identify suitable products that meet the user's present requests but have more expensive features that may be appealing to the user at the present time/status.

In some embodiments, the information exchange system collects and utilizes external data such as weather data, government policy data (e.g., energy policy, water policy, etc.), air pollution data (e.g., PM 2.5 measure), etc., when generating customized product recommendations for the individual users. For example, the recommendations are customized based on current and projected weather conditions, government's up-to-date policies related to air-pollution and energy saving plan, and/or recent natural catastrophes.

In some embodiments, product ratings by other customers, historical comments, sentiments, and purchase statistics are provided in addition to product recommendations to the user, to increase their purchasing confidence for the recommended product and reduce the decision-making time.

In some embodiments, the information exchange system takes into account belief systems and superstitions when generating product recommendations to users on different days and at different deployment locations. This type of recommendation logic can be applied to both new and existing customers. Customers subscribe to, both consciously and subconsciously, beliefs and superstitions regarding when to buy and what to buy. These beliefs and superstitions differ from culture to culture and from location to location. These beliefs and superstitions can lead to different recommendations based on Western, Chinese or India beliefs and superstitions, and based on different dates, time of day, locations, and personal and astrological facts at the time that the recommendations are made. In some embodiments, with no existing data or input about a particular customer, recommendations may still be generated for the customer based on the favorable factors for the present day and time in accordance with a predefined belief or fortune-forecasting system (e.g., astrology, Huangli, Zhouyi, Lunar calendar, etc.). For example, various recognized elemental forces, such as metal, wood, earth, air, water, wind and fire, etc. can be favorably associated with (or matched with) different actions (e.g., to buy, repair, inquire, make a deal, etc.) and product characteristics (e.g., color, size, material, function, etc.) or product categories (e.g., changing air quality, changing air temperature, changing water temperature, producing fire, producing heat, used in a kitchen, used in a bathroom, used in a bedroom, etc.), and the information exchange system, given the characteristics of the present day/time in accordance with the predefined belief system or fortune-forecasting system, can identify specific products or product categories (e.g., water heaters or coolers, air conditioners, ovens, etc.) or score them differently in the product recommendation process. The information exchange system also recommends the characteristics (e.g., price, color, size, material, etc.) of products based on the characteristics of the present day/time in accordance with the predefined belief system or fortune-forecasting system. In another scenario, if the astrological sign or birth stone, birth animal of the customer is known (e.g., derived from a known birthday, or birth month, or age), the information exchange system predicts how the user is doing at the present time (e.g., health, wealth, finance, mood, luck, urge to spend or save, etc.) based on the specific belief system and fortune forecasting systems relevant to the present customer for a specific period (e.g., past and present week or month) and makes corresponding product and sale recommendations (e.g., up-sell, vs. offer discounts or deals, etc.) to the customer. In some embodiments, if the customer's belief system is predicted or known, the information exchange system provides a suitable description of why the present recommendations would be favorable to the customer in light of the customer's belief systems and superstitions.

In some embodiments, textual output retrieved from astrological data services are parsed for keywords to identify contexts for finance/wealth, spending vs. saving, elements like air/water/fire/wind, and corresponding product domains and characteristics are activated (like air-conditioner/water cooler/oven/fan) to generate product recommendations (e.g., products, product categories, product characteristics, product features, and coupons and promotion deals, etc.).

Attention is now directed towards FIG. 2 which shows an example user interface of the frontend information exchange system in an example scenario in accordance with some embodiments. The example user interface is presented on a computer kiosk (e.g., a client device 104). In some embodiments, the conversation can be carried out by a humanoid robot or a mobile device that the user can carry with him/her while he/she browse through the deployment location of the frontend information exchange system. In addition, although the product recommendation concerns home appliance recommendations, other types of products may be recommended as well.

In this example scenario, a customer Mr. Ma entered the store, and browsed around for a little while on his own. The in-store cameras captured his images as he stood in front of some water heater models on display. When his images are processed, the information exchange system recognizes Mr. Ma through facial recognition, and starts to retrieve relevant records related to Mr. Ma. The information exchange system further recognizes that Mr. Ma had looked at water heaters recently during another visit with another person and a child at this store. Based on this data, the information exchange system determines that Mr. Ma's visit triggers the enhanced inspection criteria and initiates preprocessing regarding Mr. Ma's personal profile and product recommendation, before Mr. Ma makes direct contact with the frontend information exchange system. Mr. Ma's previous purchase records, his previous interactions with human personnel, locations associated with his previous purchases, the current weather, his style, price point, and color preferences, his decision-making triggers, his demographic data, etc. are processed and the parameters for generating a personalized, real-time product recommendation is generated based on the available data. When Mr. Ma approaches the frontend information exchange system (or alternatively, when the frontend information exchange system detects an opportunity to interact with Mr. Ma), the frontend information exchange system starts by saying in natural language: "Hello, Mr. Ma, welcome to Shenzhen! I am Xiaomei at the Shenzhen branch store. It seems that you are interested in some water heater, is that right?" This greeting is customized for Mr. Ma based on the discrepancy between the registered deployment location of the frontend information exchange system (e.g., Shenzhen), and Mr. Ma's previous delivery address on record, so the location of the deployment location is emphasized in the greeting. A different greeting with a different emphasis or conversation hook would be generated if such a location discrepancy were not detected. The frontend information exchange system further determines that the primary interest of Mr. Ma is water heater because an enhanced inspection event has been detected based on the detection of a repeat visit regarding the same product or product category recently, and in addition, the fact that Mr. Ma appeared to be accompanied by family members during at least one of these visits. In some embodiments, an image of the sales representative (e.g., Xiaomei) that previously had good rapport with Mr. Ma is displayed, and an interaction style (e.g., casual vs. formal, respectful vs. relatable, succinct vs. elaborative, etc.) and voice characteristics of that sales representative are used to generate the speech output of Xiaomei. In response to hearing Xiaomei's greetings, Mr. Ma was forthcoming with additional information, and says "Yes. I want to buy three water heaters." The frontend information exchange system, extracts the quantity keyword from Mr. Ma's answer, and activates a cross-sell and upsell model that utilizes that quantity information. The cross-sell and upsell model further utilizes the location change information to determine that the quantity of related appliances that should be recommended to Mr. Ma. For example, in a pre-stored related product categories database, the water heater belongs to a first category, and has a first related category of air conditioners and a second related category of ovens. The air conditioner category is associated with a higher profit margin than the oven category, and a higher cross-sell quantity correspondence with the water heater category (e.g., usually a household only needs one oven regardless of how many water heaters it needs, and usually a household needs at least as many air conditioners as water heaters). Based on a determination that there is a location discrepancy between the current deployment location of the frontend information exchange system and the user's previous delivery location, the information exchange system utilizes a first cross-sell quantity matching model to estimate the number of air conditioners that should be recommended to Mr. Ma (e.g., a model that does not take into account of the number of previously purchased air conditioners for the previous location of Mr. Ma). If a location discrepancy had not been detected, the information exchange system would utilize a different cross-sell quantity machine model to estimate the number of air conditioners that should be recommended to Mr. Ma (e.g., a model that takes into account of previously purchased appliances and their quantities, and the appliances age and model, to determine the new quantity for air conditioners that should be recommended to Mr. Ma's new location). Based on purchase decision triggers known about Mr. Ma, the information exchange system also determines that value as compared to styles are more important factors for Mr. Ma's purchasing decision making. The frontend information exchange system proceeds to generated recommendations based on the above processing models and logic, and outputs the following cross-sell and upsell recommendations "Ok. Would you like to also look at some air conditioners? We currently have some great deals for air conditioner and water heater bundles." When Mr. Ma consents to seeing some recommendations, the frontend information exchange system provides the recommended bundle deals to Mr. Ma, and also informs Mr. Ma that the features of the recommended models are suitable for young professionals with families (based on the knowledge that Mr. shopped with another adult and a child, and other demographic information that are deduced from the appearance and past purchasing habit of Mr. Ma). In the information provided to Mr. Ma, the model numbers, quantities, and price discounts are included for each recommended bundle. In addition, the images that are presented shows color and styles selections that are selected based on previous purchases made by Mr. Ma. The frontend information exchange system also informs Mr. Ma how the style and colors are selected, and offers the option to change them if requested. In some embodiments, if Mr. Ma does makes a request to change the style or color or other characteristics that are selected based on an existing recommendation strategy used by the recommendation generation engine, the information exchange system utilizes the rejection and new requirement in selecting a different set of models and/or a different priority of the models in generating new recommendations for similar situations in the future, in addition to revising the recommendations provided at the present time. In this example, Mr. Ma chose one of the recommended bundles, and the information exchange system offers to modify the delivery address on record. Once Mr. Ma confirms that the location discrepancy is actually a change in home address, the information exchange system triggers the upsell and cross-sell module again to inquire about other appliance needs of the customer at the new location. The above is merely an example scenario to illustrate the recommendation generation process for providing real-time, personalized product recommendations. Other features are apparent based on other disclosures and details provided herein.

FIG. 3 is a flowchart diagram of a method 300 of providing product recommendations in accordance with some embodiments. In some embodiments, the method 300 is performed by an information exchange system (e.g., a backend server 106, in conjunction with one or more frontend client devices 104). In some embodiments, method 300 is governed by instructions that are stored in a non-transitory computer readable storage medium and the instructions are executed by one or more processors of the client and server systems.

The method 300 of providing machine-generated product recommendations is performed at an electronic device (e.g., a backend server hosting a product recommendation engine) having one or more processors, and memory. The method includes deploying (302) a frontend information exchange system, wherein the frontend information exchange system provides an input user interface configured to detect one or more in-person close-proximity interactions between a user and the frontend information exchange system (e.g., interactions by voice, touch, sight, gesture, etc. that are enabled by the close physical proximity between the user and the frontend information exchange system). The information exchange system activates (304) respective input streams (e.g., image streams or periodic samples from the image streams) from one or more on-site cameras located at a current deployment location (e.g., a brick and mortar store or exhibition hall) of the frontend information exchange system, wherein each of the one or more on-site cameras is located in proximity to a respective sample product on display at the current deployment location of the frontend information exchange system (e.g., each camera is assigned to a region of the store or exhibition hall where a samples of a particular product or product category are on display and captures images of people visiting that region of the store or exhibition hall). In accordance with the respective input stream of a first camera of the one or more on-site cameras, the information exchange system registers (306) a first inspection event of a first user in association with a first sample product on display at the current deployment location of the frontend information exchange system (e.g., an inspection event is recognized by the information exchange system based on image processing of the images). For example, a camera pointed at the region where water heaters are on display captures images of a user that has stopped in that region. The images are processed and through facial recognition and motion analysis, the information exchange system determines that the user is in fact looking at a particular sample product on display in that region, and the user's identity and some of the user's demographic characteristics can be determined based on the user's facial features and appearance in general. In some embodiments, the user's facial expressions and voices may also by analyzed to determine the emotional state of the user and comments he made during his inspection of the products in that region. In some embodiments, the duration of the inspection for each product in that region is determined based on the number of frames that included the user's images. In some embodiments, whether the user is in a group of multiple users (e.g., a family or a group of friends) is also determined based on image analysis (e.g., by clustering the people in the images, and analyzing the overall cohesiveness (e.g., measured by variations in distances between the people in the various clusters) of the people in different clusters across the images from multiple cameras at different locations). In some embodiments, the sample product that is being inspected is optionally identified based on the location associated with a respective camera and/or image processing of the images from the respective camera (e.g., appearance of the product, IDs, barcodes, or other key visually identifying characteristics). The information exchange system detects (308) a first in-person close-proximity interaction between the first user and the frontend information exchange system at the current deployment location of the frontend information exchange system. For example, when a user directly interacts with the sales robot or walks up to the computer kiosk, and a camera at the location of the sales robot or kiosk captures an image of the user that meet predefined criteria (e.g., predefined proximity threshold), or a speech input is captured from the user requesting assistance, or a user scans or types in a user ID, etc., the start of a first in-person close-proximity interaction is detected, and the frontend information exchange system notifies the backend server of an in-person close proximity interaction with the user is initiated. In response to the first in-person close-proximity interaction between the first user and the frontend information exchange system, the information exchange system automatically generates (310) a first product recommendation, including: in accordance with a determination that the first inspection event of the first user that has been registered in association with the first sample product meets enhanced inspection criteria, wherein the enhanced inspection criteria includes a criterion that is met when at least a second inspection event of the first user exists in a plurality of previously stored inspection events associated with the respective first sample product, automatically adding (312) a product-specific description of the first sample product in the first product recommendation; and in accordance with a determination that the first inspection event of the first user that has been registered in association with the first sample product does not meet the enhanced inspection criteria, forgoing (314) including the product-specific description of the first sample product in the first product recommendation. For example, if it has been determined that the same user has previously inspected the same sample product, it is more likely that the user is actually interested in the inspected sample product, and the enhanced inspection criteria are met. Therefore, the level of specificity of the product recommendation is increased to a level where the product-specific description of the inspected product is mentioned in the recommendation, such as the name, model number, unique features, etc. of the inspected product, relative to a more generic mention or no mention of other products. On the other hand, if the enhanced inspection criteria are not met, it is more likely that the user is still in the general browsing stage of his decision-making. Therefore, the level of specificity of the product recommendation is kept at a relatively low level, and the recommendation is more at a stage of exploration of the user's interest and needs. So descriptions of power efficiency, color, style, general features, etc. are included in the recommendations to cover a range of possible choices of products, rather than a specific product. A listing of multiple products that are recommended user without special emphasis on a particular product is not product-specific, even if list includes for each item some product-specific description such as model number, size, etc. In some embodiments, multiple levels of specificity of product description in the recommendation are respectively correlated to different ranges of scores assigned to the current inspection event. The score assigned to the current inspection event changes as more facts are accumulated and discovered in relation to the current inspection event. For example, previous inspection event by the same person of the same product increases the score. The fact that inspection event is registered when the user is with multiple people that travels of as group (e.g., family or friends) also increases the score. In another example, a request to interact with the product in a virtual reality or augmented reality environment also increases the score. Many other factors can be taken into consideration to increase or decrease the score, and to trigger or not trigger the satisfaction of the enhanced inspection criteria. The factors are not exhaustively enumerated herein in the interest of brevity. The information exchange system provides (316), through the frontend information exchange system, the first product recommendation to the first user.

In some embodiments, for each of a plurality of sample products on display at the current deployment location of the frontend information exchange system, the information exchange system determines a respective inspection time that the first user is within a respective inspection zone of said each sample product in accordance with the respective input stream of one or more on-site cameras located in proximity to said each sample product. The information exchange system selects, from the plurality of sample products, a sample product for which the first user has the longest inspection time as the first sample product. For example, the information exchange system prioritizes the task of going back to the database to search for previous events by selecting the inspection event that is most likely to indicate user interest as the first sample product to perform the evaluation regarding whether enhanced inspection criteria are met. By doing such prioritization, the recommendations can be prepared more promptly with less expenditure of computing resources.

In some embodiments, for each of a plurality of sample products on display at the current deployment location of the frontend information exchange system, the information exchange system determines whether the first user is within a respective inspection zone of said each sample product concurrently with one or more other users as a first recognized group. From the plurality of sample products, the information exchange system selects, as the first sample product, a respective sample product of which the first user is found to be concurrently present within the respective inspection zone with the one or more other users as the first recognized group. For example, the information exchange system prioritizes the task of going back to the database to search for previous events by selecting the inspection event that is most likely to indicate user interest as the first sample product to perform the evaluation regarding whether enhanced inspection criteria are met. By doing such prioritization, the recommendations can be prepared more promptly with less expenditure of computing resources. In some embodiments, for each of a plurality of sample products of which the first user is found to be concurrently present within the respective inspection zone with one or more other users as the first recognized group, the information exchange system calculates a respective aggregated satisfaction score for the first user and the one or more other users in the first recognized group based on analysis of the respective input streams of the one or more on-site cameras. For example, the facial expressions of the users are analyzed to determine their mood and happiness level. In general, if the group as a whole is in a good mood and satisfaction scores are above a threshold, the product recommendation is more likely to succeed with respect to the first sample product or any product in general. The information exchange system selects, from the plurality of sample products of which the first user is found to be concurrently present within the respective inspection zone, a sample product for which the first user and the one or more other users in the first recognized group has the highest aggregated satisfaction score, as the first sample product. For example, the information exchange system prioritizes the task of going back to the database to search for previous events by selecting the inspection event that is most likely to indicate user satisfaction as the first sample product to perform the evaluation regarding whether enhanced inspection criteria are met. By doing such prioritization, the recommendations can be prepared more promptly with less expenditure of computing resources.

In some embodiments, providing, through the frontend information exchange system, the first product recommendation to the first user includes providing at least one natural language statement that includes one or more key words each describing a respective factor used to generate the first product recommendation. For example, the frontend information exchange system may output a speech input like this "Mr. Ma, it seems you are interested in our AXP for water heater. This model is particularly popular among young professionals with small families, such as yourself because it is highly energy efficient and can be controlled via smart devices such as an Android device (e.g., assuming the information exchange system determined that the user is wearing an Android watch through image analysis). We also have a similar model AXZ that has an enhanced self-regulation program in addition to the features of the AXP model in case you are interested." In the above statement, the keyword phrases "young professional" "small family" "energy efficient" and "controllable by Android device" are all factors used to generate the recommendation of the water heater AXP model. The above recommendation does include product-specific descriptions such as the model numbers AXP, and the product-specific feature "self-regulation program" for the AXZ model. A corresponding example of more general recommendation that does not include the product-specific description would be "Mr. Ma, it seems that you are interested in water heaters. The following models are very popular among young professionals with small families, such as yourself because it is highly energy efficient and can be controlled via smart devices such as an Android device (List the models: . . . ). Note that although the model numbers and model specific descriptions may be included as part of the list. The list is not product-specific to the first product that was inspected by the user.

In some embodiments, the information exchange system determines a set of selection factors that are relevant to the first user. The information exchange system identifies two or more alternative models for generating product recommendations for the first user based on the set of selection factors that are determined to be relevant to the first user, wherein the first product recommendation is generated based on a first model of the two or more alternative models. After providing the first product recommendation to the first user, the information exchange system detects a second in-person close-proximity interaction between the first user and the frontend information exchange system at the current deployment location of the frontend information exchange system, wherein the second in-person close-proximity includes a rejection of the first product recommendation. In accordance with a determination that the second in-person close-proximity interaction between the first user and the frontend information exchange system includes a rejection of the first product recommendation, the information exchange system automatically generates a second product recommendation using a second model of the two or more alternative models based on the set of selection factors that are determined to be relevant to the first user. By switching the models used by the information exchange system after a rejection, the underlying assumptions of the recommendations can be updated completely, and the set of selection factors used, their relative priority in the model, and their relative importance in the model, and their relative usage in the decision logic of the model can all be updated without restriction, thus generating a better recommendation based on the new information obtained through the interaction (e.g., the reasons for rejection, the style of the rejection, or the mere rejection itself). This is different from merely adjusting the parameters or weights used within a fixed model, because the underlying assumptions of the model may be wrong, or the model is not optimized for the current situation (e.g., the situation as described by all the facts and parameters currently known). In some embodiments, in accordance with a determination that the second in-person close-proximity interaction between the first user and the frontend information exchange system includes a rejection of the first product recommendation, the information exchange system analyzes the second in-person close-proximity interaction to determine one or more additional factors that are relevant to the first user that modifies or adds to the set of selection factors. For example, if the user says "I don't like my fridge to be the same color as my oven" or "I seem to have seen a report on leakage issue for this type of water heaters", or "I would like to wait on the water heater purchase until the end of the month", etc. Each of these rejections can be processed by the information exchange system to extract factors that are relevant to the user's decision. For example, based on the first statement, the color of the oven and a color difference requirement can be the additional factors identified by the information exchange system. For the second statement, product quality, explanation of negative publicity, available warranty options, and improvements made on a known issue can be the additional factors identified by the information exchange system. For the third statement, timing, price point, fortune-forecasting considerations, other types of products the user is currently considering may be the additional factors identified by the information exchange system. The analysis of the information exchange system is optionally based on keywords extraction, natural language processing to analyze intent, rule-based, or other artificial intelligence techniques. In some embodiments, if multiple additional factors are identified, the information exchange system optionally prioritizes the additional factors based on the above analysis as well. The information exchange system then automatically generates the second product recommendation using the second model based on the one or more additional factors in combination with the set of selection factors that are determined to be relevant to the first user.

In some embodiments, the method of providing machine-generated product recommendations, includes: deploying a frontend information exchange system (e.g., a computer kiosk or sales robot), wherein the frontend information exchange system provides an input user interface configured to detect one or more in-person close-proximity interactions between a user and the frontend information exchange system (e.g., interactions by voice, touch, sight, gesture, etc. that are enabled by the close physical proximity between the user and the frontend information exchange system); registering a current deployment location of the frontend information exchange system (e.g., the location registration can be part of the set-up process or initialization process of the computer kiosk or sales robot). In some embodiments, the frontend information exchange system includes a self-location system that automatically transmits its current deployment location to the backend server when the frontend information exchange system is activated. The method further includes: detecting a first in-person close-proximity interaction between a first user and the frontend information exchange system at the current deployment location of the frontend information exchange system, wherein the first in-person close-proximity interaction specifying a first product category for which the first user is seeking product recommendations. For example, when a user directly interacts with the sales robot or walks up to the computer kiosk, and a camera at the location of the sales robot or kiosk captures an image of the user that meet predefined criteria (e.g., predefined proximity threshold), or a speech input is captured from the user requesting assistance, or a user scans or types in a user ID, etc., the start of a first in-person close-proximity interaction is detected, and the frontend information exchange system notifies the backend server of an in-person close proximity interaction with the user is initiated. In some embodiments, the first in-person close proximity interaction specifies a first product category for which the user is seeking product recommendation. For example, the user selects the product category directly by speaking to the frontend information exchange system "I am looking for some water heaters." In some embodiments, the first product category is derived from the user's browsing patterns at the deployment location and the time that the user has spent in an area associated with the first product category. In some embodiments, in response to the first in-person close-proximity interaction between the first user and the frontend information exchange system, the information exchange system automatically generates a first product recommendation, wherein the first product recommendation includes a first product of the first product category (e.g., a product that is selected based at least in part on the registered current deployment location of the frontend information exchange system and other characteristics known about the user and/or about the present market). For example, if the user wants to look at water heaters, the recommendation includes a first water heater model that is selected based on the sales volume for various models and the estimated household size of the user. The information exchange system detects a respective prior purchase record of the first user for a second product in a second product category that is associated with the first product category. For example, the information exchange system stores pre-established associations between product categories based on various cross-sell strategies (e.g., based on climate conditions, based on capacity, based on location of use, based on energy efficiency levels, etc.). For example, based on capacity, whole house water heaters and whole house central heating systems are related categories, and individual water heaters and room-based air conditioners are related categories; based on energy efficiency levels, high efficiency laundry machines and high efficiency dishwashers are related categories; based on usage locations, water heaters are associated with both kitchen appliances (e.g., oven, fridge, microwave, dishwasher, etc.) and bathroom appliances (e.g., bath fixtures, bidets, etc.), etc. In accordance with a determination that the respective prior purchase record for the second product indicates a purchase or delivery location outside of a predefined geographic region of the registered current deployment location of the information exchange system (e.g., when the frontend information exchange system is deployed in Shenzhen, and the previous delivery location for an oven purchased by the user is in Beijing, and the two cities are outside of normal everyday travel distance of a user with a fixed home address), the information exchange system automatically augments the first product recommendation to include a third product from the second product category that is selected based on characteristics of the second product (for example, the information exchange system identifies an air conditioner from the related category (e.g., the room-based air conditioner category which is related to the individual water heater category) and adds it to the water heater recommendation, e.g., as a bundle). In accordance with a determination that the respective prior purchase record for the second product indicates a purchase or delivery location within the predefined geographic region of the registered current deployment location of the information exchange system, the information exchange system automatically refines the first product recommendation to further define one or more characteristics of the first product based on the characteristics of the second product. For example, if the deployment location and the user's previous delivery location are both in Shenzhen, the information exchange system uses the previous purchase record to determine one or more parameters that can be used to further refine the recommendation for the water heater. For example, if the user has previously purchased an air conditioner with a metallic finish, and a modern style, the recommendation for the water heater can have the same or similar modern style and metallic finish. If the previous purchase includes three sets of bath fixtures, the water heater models are selected to in accordance with compatibility to the bath fixtures and the quantity recommended is selected based on the quantity of the bath fixtures (e.g., at least three or four for three bathrooms and a kitchen). Some of the information from the previous purchases (e.g., style preferences) are still utilized in refining the recommendation of the first product when the location discrepancy were detected, while other information from the previous purchase (e.g., the quantity information) is only taken into consideration if there is no location discrepancy detected. In some embodiments, depending on whether there is a location discrepancy detected, some of the previous purchase information is used differently. For example, when there is no location discrepancy detected, the previous purchase quantity information is used to estimate the number of rooms in the house directly, and the number of rooms is used to select the quantity for the current product recommendation; and when there is a location discrepancy detected, the previous purchase quantity information is used to estimate the household size, and the number of current product recommendation may be selected without consideration of household size, but the model of the current product recommendation may be selected based on household size. The information exchange provides, through the frontend information exchange system, the first product recommendation to the first user after the automatic augmenting or refining of the first product recommendation. This is for example illustrated in FIG. 2.

In some embodiments, in response to the first in-person close-proximity interaction between the first user and the frontend information exchange system: the information exchange system detects a respective prior purchase record of the first user for the first product (e.g., user has previously purchased one or more water heaters and is now requesting water heater again) in addition to the respective prior purchase record for the second product (e.g., previous purchase of one or more air conditioners); and in accordance with a determination that the respective prior purchase record for the first product (e.g., the previous purchase of water heater(s)) indicates that same purchase or delivery location as the respective prior purchase record for the second product (e.g., previous purchase of the air conditioner(s)), the information exchange system automatically augments the first product recommendation to include the second product from the second product category (e.g., a recommendation of the air conditioner that was previously purchased), irrespective of whether the purchase or delivery location indicated in the respective prior purchase records for the first and second products is within the predefined geographic region of the registered current deployment location of the information exchange system. For example, if the user has previously bought one air conditioner that is still a current model on sale now or a similar model is on sale now, the information exchange system recommends that air conditioner model or the similar model to the user in addition to the recommendation of water heater that has been requested. For example, when the information exchange system determines that there is a discrepancy between the number of water heater requested and the number of air conditioners that have been purchased already (note, the quantity correspondence for water heater and air conditioner is different depending on whether the user has changed his home location), the information exchange system recommends the user to purchase more of the air conditioners to remove that quantity discrepancy.

In some embodiments, the first product recommendation is provided to the first user after the automatic augmenting of the first product recommendation to include the third product from the second product category that is selected based on the characteristics of the second product. In some embodiments, the information exchange system detects, through the frontend information exchange system, a user input rejecting the third product from the second product category that is included in the first product recommendation; and in response to detecting the user input rejecting the third product from the second product category that is included in the first product recommendation, revising the first product recommendation to remove the third product from the second product category and include a fourth product from a respective product category for which the first user has no prior purchase record. For example, when rejecting the previously purchased air conditioner included in the first recommendation, the user may say "I don't want any air conditioners now" or "I don't like that air conditioner", or "I want a different colored air conditioner this time", or "That air conditioner was too noisy", etc. The information exchange system analyzes the user's intent regarding the recommendation for the previously purchased product, and if the user does not wish to purchase any of that product at the present time, the information exchange system removes the recommendation for the previously purchased air conditioner, and recommends something completely different (e.g., a dish washer, if the information exchange system determines that the user has not previously purchased a dish washer in accordance with the past record). In some embodiments, the recommendation for the air conditioner may not be exactly the same model as the one previously purchased, and instead, it may be a model that is selected based on the previously purchased model and that has parameters fitting the present time and characteristics of the user. In such a case, the information exchange system may also revise the recommendation and choose a different model from the same product category based on new information contained in the user's response.

In some embodiments, the first product recommendation is provided to the first user after the automatic refining of the first product recommendation to further define one or more characteristics of the first product based on the characteristics of the second product, and wherein the automatic refining includes: determining a size category of the first product (e.g., size category of water heater is medium or small); determining a size category of the second product (e.g., the size category of a room-based air conditioner is medium, the size category of a fridge is large); in accordance with a determination that the size category of the first product is distinct from the size category of the second product (e.g., the size categories of the two products are different, one large, one small), defining the one or more characteristics of the first product based on the characteristics of the second product in accordance with a pre-stored contrasting matching scheme (e.g., colors and/or textures that are high contrast for the two different size categories); and in accordance with a determination that the size category of the first product is the same as the size category of the second product (e.g., both are large size categories), defining the one or more characteristics of the first product based on the characteristics of the second product in accordance with a pre-stored harmonizing matching scheme (e.g., the same or similar finishes and/or colors for the two large appliances).

In some embodiments, the information exchange system establishes a correspondence database that includes, for each respective product category of a plurality of product categories, a corresponding set of fortune forecasting parameters that are determined to be compatible with the respective product category (e.g., for air conditioners, the compatible parameters include the elemental forces ice, metal, air, water, and incompatible parameters include the elemental forces fire, earth, wood, etc.; while for ovens the compatible parameters include the elemental forces fire, metal, and air; and the incompatible elemental forces wood, water, and earth, etc.). In response to the first in-person close-proximity interaction between the first user and the frontend information exchange system: the information exchange system identifies a set of fortune forecasting parameters that are currently valid for the first user (e.g., the fortune forecasting principles' of the user's belief system, or a third-party fortune-telling website predicts that the people of the user's birth month have favorable outcomes when taking actions involving the elemental force of water and/or have unfavorable outcomes when taking actions involving the elemental force of fire). In accordance with the correspondence database, the information exchange system identifies a third product category from the plurality of product categories that corresponds to the set of fortune forecasting parameters that are currently valid for the first user. For example, given that the fortune forecasting indicates that the user should engage in activity involving the elemental force of water, the information exchange system recommends an air conditioner as opposed to an oven to the user, even if both are permissible recommendations based on other considerations. The information exchange system augments the first product recommendation to include one or more products from the third product category with the first product.

In some embodiments, the first in-person close-proximity interaction specifies a first product quantity for the first product category that the first user intends to purchase. The information exchange system automatically generates a digital deal that bundles the first product of the first product quantity and the third product of a second product quantity that is selected based on the first product quantity. An example of the quantity correspondence is described with respect to the example shown in FIG. 2. Other quantity correspondences are also optionally used in different embodiments and scenarios. In some embodiments, selecting the second product quantity includes: in accordance with the determination that the respective prior purchase record for the second product indicates a purchase or delivery location outside of the predefined geographic region of the registered current deployment location of the information exchange system, selecting the second product quantity based on the first product quantity without regard to a prior purchase quantity of the second product indicated in the respective prior purchase record; and in accordance with a determination that the respective prior purchase record for the second product indicates a purchase or delivery location within the predefined geographic region of the registered current deployment location of the information exchange system, selecting the second product quantity based on the first product quantity and the prior purchase quantity of the second product indicated in the respective prior purchase record. For example, the quantity is adjusted depending on whether the user has moved to a new home. The quantity is recalculated without or without regard to the previous purchase quantities, depending on whether the user has moved, in some embodiments.

It should be understood that the particular order in which the operations have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 300 described above.

Figure 4:
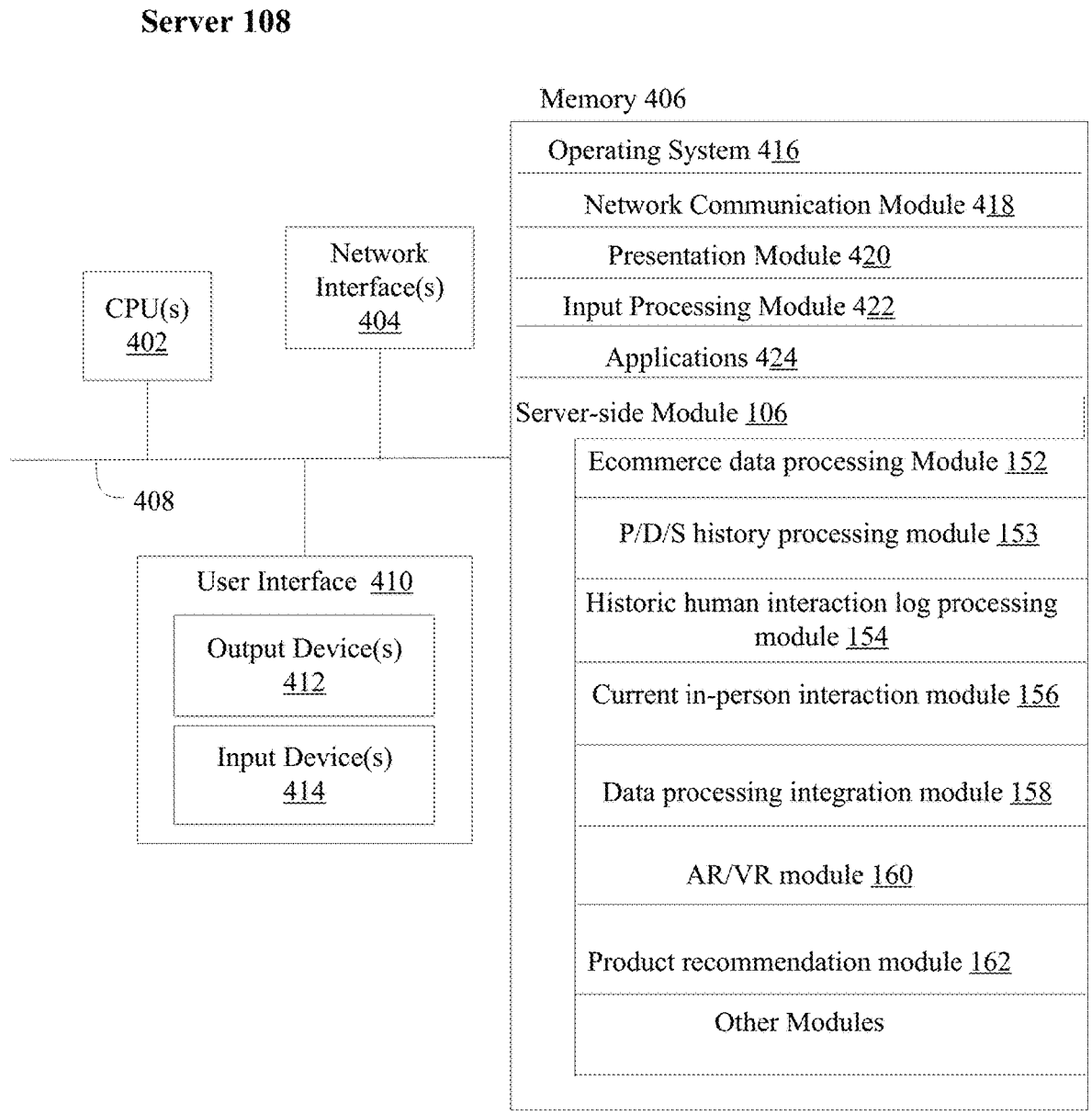
FIG. 4 is a block diagram of a server or backend information exchange system in accordance with some embodiments.

FIG. 4 is a block diagram illustrating a representative server 108 (e.g., serving as a backend information exchange system) in accordance with some embodiments. Server 108, typically, includes one or more processing units (CPUs) 402 (e.g., processors 112 in FIG. 1A), one or more network interfaces 404, memory 406, and one or more communication buses 408 for interconnecting these components (sometimes called a chipset). Server 108 also optionally includes a user interface 410. User interface 410 includes one or more output devices 412 that enable presentation of media content, including one or more speakers and/or one or more visual displays. User interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Memory 406 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- operating system 416 including procedures for handling various basic system services and for performing hardware dependent tasks;
- network communication module 418 for connecting server 108 to other computing devices (e.g., client devices 104 or third-party services 122) connected to one or more networks 110 via one or more network interfaces 404 (wired or wireless);
- presentation module 420 for enabling presentation of information (e.g., a user interface for application(s), widgets, web pages, audio and/or video content, text, etc.) at server 108 via one or more output devices 412 (e.g., displays, speakers, etc.) associated with user interface 410;
- input processing module 422 for detecting one or more user inputs or interactions from one of the one or more input devices 414 and interpreting the detected input or interaction;
- one or more applications 424 for execution by server 108;
- server-side module 106, which provides server-side data processing and functionalities, including but not limited to:
  - ecommerce data processing module 152 for processing market data, sales data, product data, competitor data, etc. to identify aggregated data related to price, market segments, product segments, industry trends, product features, consumer sentiment, product review, cross-sell correlation, etc.;
  - purchase/delivery/service history processing module 153 for processing past records of users' purchase, delivery and service history records to determine home address, social class, product purchased, time of purchase of product, factors influencing purchase decisions, satisfaction, past experiences with the product, knowledge of product features, style preferences, price point, etc.;
  - Historic human interaction log processing module 154 for processing past records of users' interactions with human personnel as documented by the human personnel to determine relevant characteristics of the individual users, such as personal style, human interaction style, living environment, demographic data, personal tidbits for developing rapport, etc.;
  - Current in-person interaction module 156 for processing input from the current visit of the user such as images, speech input, and other relevant inputs and peripheral data at the present time (e.g., current weather, current external events, etc.).
  - Data processing integration module 158 for selecting the suitable processing modules, prioritizing their operations, and integrating results from some processing modules to provide input to other processing modules, based on the current available data, newly acquired data, and intermediate results;
  - Augmented reality and virtual reality processing module for generating augmented reality and virtual reality experiences for the user based on the products that the user has inspected, products recommended to the user, products the user requests, and the user's characteristics, preferences, interaction styles, etc.
  - Product recommendation module 162 for generating product recommendations to the user based on the results of the different modules;
  - other modules for performing other functions set forth herein.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 806, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in the Figures are merely illustrative, and different configurations of the modules for implementing the functions described herein are possible in various embodiments.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 5:
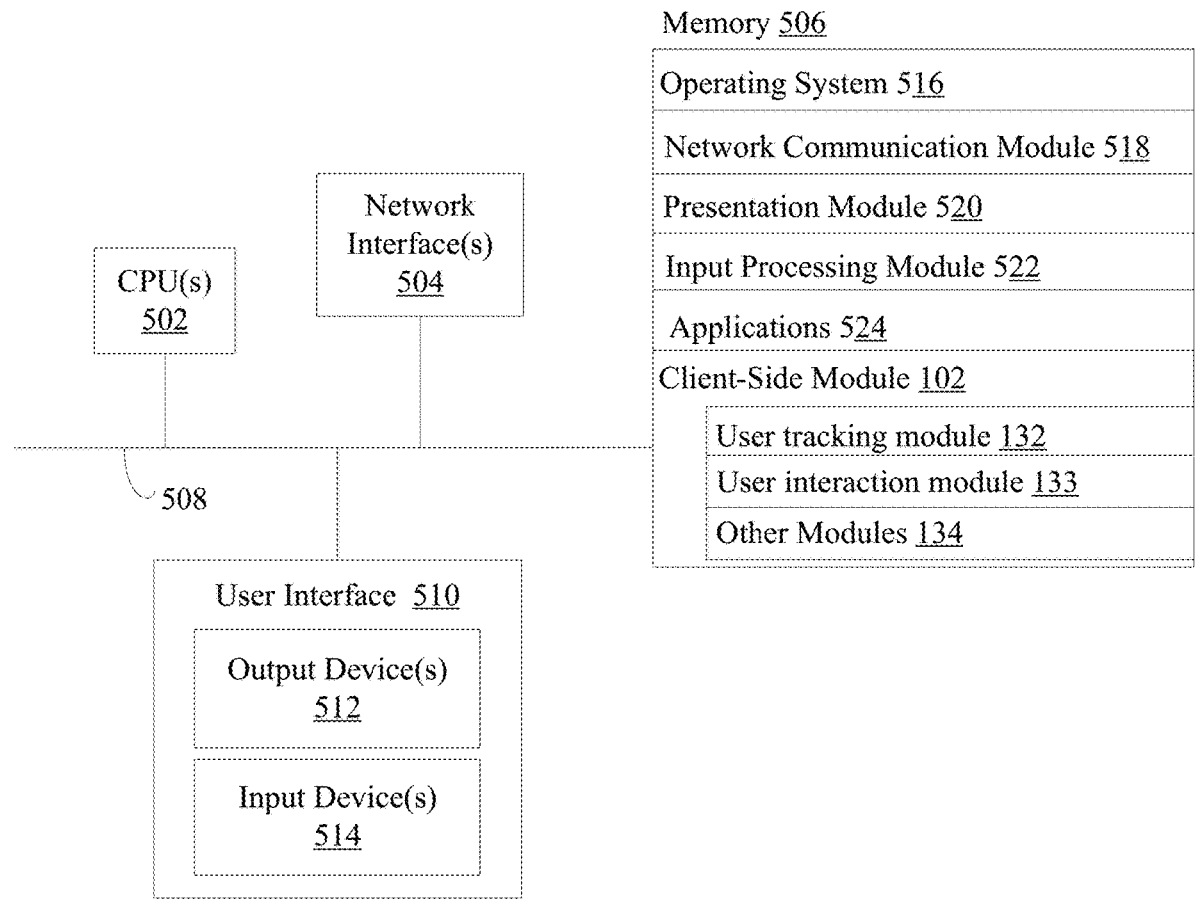
FIG. 5 is a block diagram of a client device or frontend information exchange system in accordance with some embodiments.

FIG. 5 is a block diagram illustrating a representative client device 104 (e.g., serving as a frontend information exchange system) in accordance with some embodiments. Client device 104, typically, includes one or more processing units (CPUs) 502 (e.g., processors 128), one or more network interfaces 504, memory 506, and one or more communication buses 508 for interconnecting these components (sometimes called a chipset). Client device 104 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 further includes sensors, which provide context information as to the current state of client device 104 or the environmental conditions associated with client device 104. Sensors include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 506 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

- operating system 516 including procedures for handling various basic system services and for performing hardware dependent tasks;
- network communication module 518 for connecting client device 104 to other computing devices (e.g., server system 108) connected to one or more networks 110 via one or more network interfaces 504 (wired or wireless);
- presentation module 520 for enabling presentation of information (e.g., a user interface for presenting text, images, video, webpages, audio, etc.) at client device 104 via one or more output devices 812 (e.g., displays, speakers, etc.) associated with user interface 510;
- input processing module 522 for detecting one or more user inputs or interactions from one of the one or more input devices 514 and interpreting the detected input or interaction;
- one or more applications 524 for execution by client device 104 (e.g., payment platforms, media player, and/or other web or non-web based applications);
- client-side module 102, which provides client-side data processing and functionalities, including but not limited to:
- user tracking module 132 for tracking movement of the user at the deployment location of the client device;
- user interaction module 133 for implementing the direct and indirect interactions with the user during the user's visit at the deployment location; and
- other modules 134 for performing other functions set forth herein.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 806, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in the Figures are merely illustrative, and different configurations of the modules for implementing the functions described herein are possible in various embodiments.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

What is claimed is:

1. A method, comprising:
    at an electronic device having one or more processors, and memory:
        deploying a frontend information exchange system, wherein the frontend information exchange system provides an input user interface configured to detect one or more in-person close-proximity interactions between a user and the frontend information exchange system;

activating respective input streams from one or more on-site cameras located at a current deployment location of the frontend information exchange system, wherein each of the one or more on-site cameras is located in proximity to a respective sample product on display at the current deployment location of the frontend information exchange system;

in accordance with the respective input stream of a first camera of the one or more on-site cameras, registering a first inspection event of a first user in association with a first sample product on display at the current deployment location of the frontend information exchange system;

detecting a first in-person close-proximity interaction between the first user and the frontend information exchange system at the current deployment location of the frontend information exchange system;

in response to the first in-person close-proximity interaction between the first user and the frontend information exchange system, automatically generating a first product recommendation, including:

in accordance with a determination that the first inspection event of the first user that has been registered in association with the first sample product meets enhanced inspection criteria, wherein the enhanced inspection criteria include a criterion that is met when at least a second inspection event of the first user exists in a plurality of previously stored inspection events associated with the respective first sample product, automatically adding a product-specific description of the first sample product in the first product recommendation; and in accordance with a determination that the first inspection event of the first user that has been registered in association with the first sample product does not meet the enhanced inspection criteria, forgoing including the product-specific description of the first sample product in the first product recommendation; and providing, through the frontend information exchange system, the first product recommendation to the first user.

2. The method of claim 1, comprising:

for each of a plurality of sample products on display at the current deployment location of the frontend information exchange system, determining a respective inspection time that the first user is within a respective inspection zone of said each sample product in accordance with the respective input stream of one or more on-site cameras located in proximity to said each sample product; and selecting, from the plurality of sample products, a sample product for which the first user has the longest inspection time as the first sample product.

3. The method of claim 1, including:

for each of a plurality of sample products on display at the current deployment location of the frontend information exchange system, determining whether the first user is within a respective inspection zone of said each sample product concurrently with one or more other users as a first recognized group; and from the plurality of sample products, selecting, as the first sample product, a respective sample product of which the first user is found to be concurrently present within the respective inspection zone with the one or more other users as the first recognized group.

4. The method of claim 3, including:

for each of a plurality of sample products of which the first user is found to be concurrently present within the respective inspection zone with one or more other users as the first recognized group, calculating a respective aggregated satisfaction score for the first user and the one or more other users in the first recognized group based on analysis of the respective input streams of the one or more on-site cameras; and selecting, from the plurality of sample products of which the first user is found to be concurrently present within the respective inspection zone, a sample product for which the first user and the one or more other users in the first recognized group has the highest aggregated satisfaction score, as the first sample product.

5. The method of claim 1, wherein providing, through the frontend information exchange system, the first product recommendation to the first user includes:

providing at least one natural language statement that includes one or more key words each describing a respective factor used to generate the first product recommendation.

6. The method of claim 1, including:

determining a set of selection factors that are relevant to the first user;

identifying two or more alternative models for generating product recommendations for the first user based on the set of selection factors that are determined to be relevant to the first user, wherein the first product recommendation is generated based on a first model of the two or more alternative models;

after providing the first product recommendation to the first user, detecting a second in-person close-proximity interaction between the first user and the frontend information exchange system at the current deployment location of the frontend information exchange system, wherein the second in-person close-proximity includes a rejection of the first product recommendation; and in accordance with a determination that the second in-person close-proximity interaction between the first user and the frontend information exchange system includes a rejection of the first product recommendation, automatically generating a second product recommendation using a second model of the two or more alternative models based on the set of selection factors that are determined to be relevant to the first user.

7. The method of claim 6, including:

in accordance with a determination that the second in-person close-proximity interaction between the first user and the frontend information exchange system includes a rejection of the first product recommendation, analyzing the second in-person close-proximity interaction to determine one or more additional factors that are relevant to the first user that modifies or adds to the set of selection factors; and automatically generating the second product recommendation using the second model based on the one or more additional factors in combination with the set of selection factors that are determined to be relevant to the first user.

8. A system, comprising:

one or more processors; and memory storing instructions which when executed by one or more processors, cause the processors to perform operations comprising:

deploying a frontend information exchange system, wherein the frontend information exchange system provides an input user interface configured to detect one or more in-person close-proximity interactions between a user and the frontend information exchange system;

activating respective input streams from one or more on-site cameras located at a current deployment location of the frontend information exchange system, wherein each of the one or more on-site cameras is located in proximity to a respective sample product on display at the current deployment location of the frontend information exchange system;

in accordance with the respective input stream of a first camera of the one or more on-site cameras, registering a first inspection event of a first user in association with a first sample product on display at the current deployment location of the frontend information exchange system;

detecting a first in-person close-proximity interaction between the first user and the frontend information exchange system at the current deployment location of the frontend information exchange system;

in response to the first in-person close-proximity interaction between the first user and the frontend information exchange system, automatically generating a first product recommendation, including:

in accordance with a determination that the first inspection event of the first user that has been registered in association with the first sample product meets enhanced inspection criteria, wherein the enhanced inspection criteria include a criterion that is met when at least a second inspection event of the first user exists in a plurality of previously stored inspection events associated with the respective first sample product, automatically adding a product-specific description of the first sample product in the first product recommendation; and in accordance with a determination that the first inspection event of the first user that has been registered in association with the first sample product does not meet the enhanced inspection criteria, forgoing including the product-specific description of the first sample product in the first product recommendation; and providing, through the frontend information exchange system, the first product recommendation to the first user.

9. The system of claim 8, wherein the operations include:

for each of a plurality of sample products on display at the current deployment location of the frontend information exchange system, determining a respective inspection time that the first user is within a respective inspection zone of said each sample product in accordance with the respective input stream of one or more on-site cameras located in proximity to said each sample product; and selecting, from the plurality of sample products, a sample product for which the first user has the longest inspection time as the first sample product.

10. The system of claim 8, wherein the operations include:

for each of a plurality of sample products on display at the current deployment location of the frontend information exchange system, determining whether the first user is within a respective inspection zone of said each sample product concurrently with one or more other users as a first recognized group; and from the plurality of sample products, selecting, as the first sample product, a respective sample product of which the first user is found to be concurrently present within the respective inspection zone with the one or more other users as the first recognized group.

11. The system of claim 10, wherein the operations include:

for each of a plurality of sample products of which the first user is found to be concurrently present within the respective inspection zone with one or more other users as the first recognized group, calculating a respective aggregated satisfaction score for the first user and the one or more other users in the first recognized group based on analysis of the respective input streams of the one or more on-site cameras; and selecting, from the plurality of sample products of which the first user is found to be concurrently present within the respective inspection zone, a sample product for which the first user and the one or more other users in the first recognized group has the highest aggregated satisfaction score, as the first sample product.

12. The system of claim 10, wherein providing, through the frontend information exchange system, the first product recommendation to the first user includes:

providing at least one natural language statement that includes one or more key words each describing a respective factor used to generate the first product recommendation.

13. The system of claim 8, wherein the operations include:

determining a set of selection factors that are relevant to the first user;

identifying two or more alternative models for generating product recommendations for the first user based on the set of selection factors that are determined to be relevant to the first user, wherein the first product recommendation is generated based on a first model of the two or more alternative models;

after providing the first product recommendation to the first user, detecting a second in-person close-proximity interaction between the first user and the frontend information exchange system at the current deployment location of the frontend information exchange system, wherein the second in-person close-proximity includes a rejection of the first product recommendation; and in accordance with a determination that the second in-person close-proximity interaction between the first user and the frontend information exchange system includes a rejection of the first product recommendation, automatically generating a second product recommendation using a second model of the two or more alternative models based on the set of selection factors that are determined to be relevant to the first user.

14. The system of claim 13, wherein the operations include:

in accordance with a determination that the second in-person close-proximity interaction between the first user and the frontend information exchange system includes a rejection of the first product recommendation, analyzing the second in-person close-proximity interaction to determine one or more additional factors that are relevant to the first user that modifies or adds to the set of selection factors; and automatically generating the second product recommendation using the second model based on the one or more additional factors in combination with the set of selection factors that are determined to be relevant to the first user.

15. A non-transitory computer-readable storage medium storing instructions, the instructions, when executed by one or more processors, cause the processors to perform operations comprising:
  deploying a frontend information exchange system, wherein the frontend information exchange system provides an input user interface configured to detect one or more in-person close-proximity interactions between a user and the frontend information exchange system;
  activating respective input streams from one or more on-site cameras located at a current deployment location of the frontend information exchange system, wherein each of the one or more on-site cameras is located in proximity to a respective sample product on display at the current deployment location of the frontend information exchange system;
  in accordance with the respective input stream of a first camera of the one or more on-site cameras, registering a first inspection event of a first user in association with a first sample product on display at the current deployment location of the frontend information exchange system;
  detecting a first in-person close-proximity interaction between the first user and the frontend information exchange system at the current deployment location of the frontend information exchange system;
  in response to the first in-person close-proximity interaction between the first user and the frontend information exchange system, automatically generating a first product recommendation, including:
    in accordance with a determination that the first inspection event of the first user that has been registered in association with the first sample product meets enhanced inspection criteria, wherein the enhanced inspection criteria include a criterion that is met when at least a second inspection event of the first user exists in a plurality of previously stored inspection events associated with the respective first sample product, automatically adding a product-specific description of the first sample product in the first product recommendation; and
    in accordance with a determination that the first inspection event of the first user that has been registered in association with the first sample product does not meet the enhanced inspection criteria, forgoing including the product-specific description of the first sample product in the first product recommendation; and
  providing, through the frontend information exchange system, the first product recommendation to the first user.

16. The computer-readable storage medium of claim 15, wherein the operations include:
  for each of a plurality of sample products on display at the current deployment location of the frontend information exchange system, determining a respective inspection time that the first user is within a respective inspection zone of said each sample product in accordance with the respective input stream of one or more on-site cameras located in proximity to said each sample product; and
  selecting, from the plurality of sample products, a sample product for which the first user has the longest inspection time as the first sample product.

17. The computer-readable storage medium of claim 15, wherein the operations include:
  for each of a plurality of sample products on display at the current deployment location of the frontend information exchange system, determining whether the first user is within a respective inspection zone of said each sample product concurrently with one or more other users as a first recognized group; and
  from the plurality of sample products, selecting, as the first sample product, a respective sample product of which the first user is found to be concurrently present within the respective inspection zone with the one or more other users as the first recognized group.

18. The computer-readable storage medium of claim 17, wherein the operations include:
  for each of a plurality of sample products of which the first user is found to be concurrently present within the respective inspection zone with one or more other users as the first recognized group, calculating a respective aggregated satisfaction score for the first user and the one or more other users in the first recognized group based on analysis of the respective input streams of the one or more on-site cameras; and
  selecting, from the plurality of sample products of which the first user is found to be concurrently present within the respective inspection zone, a sample product for which the first user and the one or more other users in the first recognized group has the highest aggregated satisfaction score, as the first sample product.

19. The computer-readable storage medium of claim 18, wherein providing, through the frontend information exchange system, the first product recommendation to the first user includes:
  providing at least one natural language statement that includes one or more key words each describing a respective factor used to generate the first product recommendation.

20. The computer-readable storage medium of claim 15, wherein the operations include:
  determining a set of selection factors that are relevant to the first user;
  identifying two or more alternative models for generating product recommendations for the first user based on the set of selection factors that are determined to be relevant to the first user, wherein the first product recommendation is generated based on a first model of the two or more alternative models;
  after providing the first product recommendation to the first user, detecting a second in-person close-proximity interaction between the first user and the frontend information exchange system at the current deployment location of the frontend information exchange system, wherein the second in-person close-proximity includes a rejection of the first product recommendation; and
  in accordance with a determination that the second in-person close-proximity interaction between the first user and the frontend information exchange system includes a rejection of the first product recommendation, automatically generating a second product recommendation using a second model of the two or more alternative models based on the set of selection factors that are determined to be relevant to the first user.

* * * * *